(12) United States Patent
Do et al.

(10) Patent No.: US 9,736,649 B1
(45) Date of Patent: Aug. 15, 2017

(54) ANTENNA POSITIONING USING DATA ACROSS AIR INTERFACE TYPES

(71) Applicant: QUALCOMM Incorporated, San Diego, CA (US)

(72) Inventors: Ju-Yong Do, Cupertino, CA (US); Mark Moeglein, Lummi Island, WA (US); Weihua Gao, San Jose, CA (US); Gengsheng Zhang, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/262,843

(22) Filed: Sep. 12, 2016

(51) Int. Cl.
*H04W 24/00* (2009.01)
*H04W 4/02* (2009.01)
*H01Q 1/24* (2006.01)

(52) U.S. Cl.
CPC .............. *H04W 4/025* (2013.01); *H01Q 1/24* (2013.01); *H04W 4/023* (2013.01)

(58) Field of Classification Search
None
See application file for complete search history.

(56) References Cited

U.S. PATENT DOCUMENTS

| 8,547,277 | B1 | 10/2013 | Mitchell |
| 2005/0037775 | A1 | 2/2005 | Moeglein et al. |
| 2010/0009698 | A1* | 1/2010 | Yang ................. G06F 17/30241 455/456.3 |
| 2010/0120447 | A1* | 5/2010 | Anderson ........... H04W 64/003 455/456.1 |
| 2014/0205205 | A1 | 7/2014 | Neubauer |
| 2014/0244167 | A1 | 8/2014 | Reynolds |
| 2015/0341894 | A1 | 11/2015 | Rowitch |

\* cited by examiner

*Primary Examiner* — Idowu O Osifade
(74) *Attorney, Agent, or Firm* — Kilpatrick Townsend & Stockton LLP

(57) ABSTRACT

Disclosed herein are techniques for determining a location of an antenna supporting structure. Crowdsourced data associated with antennas that are installed on a same antenna supporting structure but are used for different air interface types and/or data from aerial images can be used, alone or in combination, to more accurately and more efficiently determine the location of the antenna supporting structure and therefore the locations of the antennas on the antenna supporting structure.

30 Claims, 15 Drawing Sheets

700

710
Obtain a first set of data associated with a first antenna for a first air interface type, the first antenna installed on the antenna supporting structure 720
Obtain a second set of data associated with a second antenna for a second air interface type different from the first air interface type, the second antenna installed on the antenna supporting structure 730
Determine the location of the antenna supporting structure using, for example, a trilateration or triangulation technique, based on at least some data from the first set of data and at least some data from the second set of data

US 9,736,649 B1

ANTENNA POSITIONING USING DATA ACROSS AIR INTERFACE TYPES

BACKGROUND

Techniques disclosed herein relate to antenna positioning in a wireless communication system. Location information of a wireless communication antenna may be used in many applications. For example, the location of the antenna may allow a location-based service to determine the location of a mobile device. However, in many cases, an antenna supporting structure (e.g., a cell tower of a base transceiver station) may be deployed in a particular location unknown to or not readily accessible by a user. Information regarding the locations of various antennas or antenna supporting structures may only be available to mobile service providers that use the antenna supporting structures or other entities responsible for the antenna supporting structures for various reasons. In some circumstances, even mobile service providers may not know the exact locations of many antenna supporting structures inside and/or outside of their own networks. For at least these reasons, it is difficult to get complete and accurate information regarding the locations of various antennas and antenna supporting structures.

BRIEF SUMMARY

Some example techniques are presented herein which may be implemented in various methods and apparatuses in mobile devices or servers to provide for or otherwise support location determination in mobile devices, access points, or base transceiver stations. More specifically, disclosed herein are techniques for obtaining location information regarding wireless communication antennas for access points or base transceiver stations using data from different types of air interface technologies and/or imaging processing techniques.

In accordance with an example implementation, a method for determining a location of an antenna supporting structure may be provided. The method may include obtaining a first set of data associated with a first antenna that is installed on the antenna supporting structure and is used for a first air interface type, obtaining a second set of data associated with a second antenna that is installed on the antenna supporting structure and is used for a second air interface type different from the first air interface type, and determining the location of the antenna supporting structure using combined data including the first set of data and the second set of data.

In various embodiments, the first air interface type may include at least one of Global System for Mobile Communications (GSM), Code Division Multiple Access (CDMA), Wideband-CDMA (W-CDMA), Universal Mobile Telecommunications System (UMTS), Long Term Evolution (LTE), or LTE advanced, and the second air interface type may include at least one of GSM, CDMA, W-CDMA, UMTS, LTE, or LTE advanced.

In some embodiments, the first set of data may include information regarding a distance or a time of flight of a wireless signal between a mobile device and the first antenna. In some embodiments, the second set of data may include information regarding a distance or a time of flight of a wireless signal between a mobile device and the second antenna. In some embodiments, determining the location of the antenna supporting structure using combined data may include performing a multi-lateration or multi-angulation operation using at least some data from the first set of data and at least some data from the second set of data.

In some embodiments, the method for determining the location of the antenna supporting structure may also include obtaining a third set of data associated with a third antenna that is installed on the antenna supporting structure and is used for a third air interface type different from the first and the second air interface types, where determining the location of the antenna supporting structure may include performing a multi-lateration or multi-angulation operation using at least some data from the first set of data, at least some data from the second set of data, and at least some data from the third set of data.

In some embodiments, determining the location of the antenna supporting structure using combined data may include determining a first location of the first antenna based on the first set of data, determining a second location of the second antenna based on the second set of data by using the first location as a candidate location for the second location, and assigning the second location as the location of the antenna supporting structure.

In some embodiments, determining the location of the antenna supporting structure using combined data may include determining a first candidate region for a location of the first antenna based on the first set of data, determining a second candidate region for a location of the second antenna based on the second set of data, and determining the location of the antenna supporting structure based on an overlapped region of the first candidate region and the second candidate region.

In some embodiments, determining the location of the antenna supporting structure using combined data may include identifying the first air interface type or the second air interface type as an air interface type that allows for more accurate antenna location determination based on the first set of data and the second set of data, determining an antenna location based on the first set of data or the second set of data associated with the air interface type that allows for more accurate antenna location determination, and assigning the antenna location as the location of the antenna supporting structure.

In some embodiments, determining the location of the antenna supporting structure using combined data may include determining a candidate location of the antenna supporting structure based on at least one of the first set of data or the second set of data; obtaining an aerial image of a geographic area including the candidate location, where the aerial image includes associated metadata indicating a geographic location of the geographic area; identifying the antenna supporting structure in the aerial image using computer-based image processing; determining a relative position of the antenna supporting structure identified using the computer-based image processing in the geographic area; and determining the location of the identified antenna supporting structure based on the metadata and the relative position of the antenna supporting structure in the geographic area.

In some embodiments, the method for determining the location of the antenna supporting structure may also include identifying the first antenna and the second antenna as installed on the antenna supporting structure.

In accordance with another example implementation, a system may be provided, which may include a memory including machine-readable instructions stored thereon and a processing unit communicatively coupled to the memory. The processing unit may be configured to execute the machine-readable instructions to determine a location of an antenna supporting structure by obtaining a first set of data associated with a first antenna that is installed on the antenna supporting structure and is used for a first air interface type, obtaining a second set of data associated with a second antenna that is installed on the antenna supporting structure and is used for a second air interface type different from the first air interface type, and determining the location of the antenna supporting structure using combined data including the first set of data and the second set of data.

In some embodiments of the system, the first air interface type may include at least one of GSM, CDMA, W-CDMA, UMTS, LTE, or LTE advanced, and the second air interface type may include at least one of GSM, CDMA, W-CDMA, UMTS, LTE, or LTE advanced. In some embodiments, the first set of data may include information regarding a distance or a time of flight of a wireless signal between a mobile device and the first antenna. In some embodiments, the second set of data may include information regarding a distance or a time of flight of a wireless signal between a mobile device and the second antenna.

In some embodiments of the system, the processing unit may be further configured to execute the machine-readable instructions to determine the location of the antenna supporting structure by obtaining a third set of data associated with a third antenna that is installed on the antenna supporting structure and is used for a third air interface type different from the first and the second air interface types, where determining the location of the antenna supporting structure may include performing a multi-lateration or multi-angulation operation using at least some data from the first set of data, at least some data from the second set of data, and at least some data from the third set of data.

In some embodiments of the system, determining the location of the antenna supporting structure using combined data may include performing a multi-lateration or multi-angulation operation using at least some data from the first set of data and at least some data from the second set of data.

In some embodiments of the system, determining the location of the antenna supporting structure using combined data may include determining a first location of the first antenna based on the first set of data, determining a second location of the second antenna based on the second set of data by using the first location as a candidate location for the second location, and assigning the second location as the location of the antenna supporting structure.

In some embodiments of the system, determining the location of the antenna supporting structure using combined data may include determining a first candidate region for a location of the first antenna based on the first set of data, determining a second candidate region for a location of the second antenna based on the second set of data, and determining the location of the antenna supporting structure based on an overlapped region of the first candidate region and the second candidate region.

In some embodiments of the system, determining the location of the antenna supporting structure using combined data may include identifying the first air interface type or the second air interface type as an air interface type that allows for more accurate antenna location determination based on the first set of data and the second set of data, determining an antenna location based on the first set of data or the second set of data associated with the air interface type that allows for more accurate antenna location determination, and assigning the antenna location as the location of the antenna supporting structure.

In some embodiments of the system, determining the location of the antenna supporting structure using combined data may include determining a candidate location of the antenna supporting structure based on at least one of the first set of data or the second set of data; obtaining an aerial image of a geographic area including the candidate location, where the aerial image includes associated metadata indicating a geographic location of the geographic area; identifying the antenna supporting structure in the aerial image using computer-based image processing; determining a relative position of the antenna supporting structure identified using the computer-based image processing in the geographic area; and determining the location of the identified antenna supporting structure based on the metadata and the relative position of the antenna supporting structure in the geographic area.

In accordance with yet another example implementation, a non-transitory computer-readable storage medium including machine-readable instructions stored thereon may be provided. The instructions, when executed by one or more processing units, may cause the one or more processing units to determine a location of an antenna supporting structure by obtaining a first set of data associated with a first antenna that is installed on the antenna supporting structure and is used for a first air interface type, obtaining a second set of data associated with a second antenna that is installed on the antenna supporting structure and is used for a second air interface type different from the first air interface type, and determining the location of the antenna supporting structure using combined data including the first set of data and the second set of data.

In some embodiments of the non-transitory computer-readable storage medium, the first air interface type may include at least one of GSM, CDMA, W-CDMA, UMTS, LTE, or LTE advanced, and the second air interface type may include at least one of GSM, CDMA, W-CDMA, UMTS, LTE, or LTE advanced. In some embodiments, the first set of data may include information regarding a distance or a time of flight of a wireless signal between a mobile device and the first antenna. In some embodiments, the second set of data may include information regarding a distance or a time of flight of a wireless signal between a mobile device and the second antenna.

In some embodiments of the non-transitory computer-readable storage medium, determining the location of the antenna supporting structure using combined data may include performing a multi-lateration or multi-angulation operation using at least some data from the first set of data and at least some data from the second set of data.

In some embodiments of the non-transitory computer-readable storage medium, determining the location of the antenna supporting structure using combined data may include determining a first location of the first antenna based on the first set of data, determining a second location of the second antenna based on the second set of data by using the first location as a candidate location for the second location, and assigning the second location as the location of the antenna supporting structure.

In some embodiments of the non-transitory computer-readable storage medium, determining the location of the antenna supporting structure using combined data may include identifying the first air interface type or the second air interface type as an air interface type that allows for more accurate antenna location determination based on the first set of data and the second set of data, determining an antenna location based on the first set of data or the second set of data associated with the air interface type that allows for more accurate antenna location determination, and assigning the antenna location as the location of the antenna supporting structure.

In some embodiments of the non-transitory computer-readable storage medium, determining the location of the antenna supporting structure using combined data may include determining a candidate location of the antenna supporting structure based on at least one of the first set of data or the second set of data; obtaining an aerial image of a geographic area including the candidate location, the aerial image including associated metadata indicating a geographic location of the geographic area; identifying the antenna supporting structure in the aerial image using computer-based image processing; determining a relative position of the antenna supporting structure identified using the computer-based image processing in the geographic area; and determining the location of the identified antenna supporting structure based on the metadata and the relative position of the antenna supporting structure in the geographic area.

In accordance with still another example implementation, an apparatus may be provided which may comprise means for obtaining a first set of data associated with a first antenna that is installed on an antenna supporting structure and is used for a first air interface type, means for obtaining a second set of data associated with a second antenna that is installed on the antenna supporting structure and is used for a second air interface type different from the first air interface type, and means for determining a location of the antenna supporting structure using combined data including the first set of data and the second set of data.

In some embodiments of the apparatus, the first air interface type may include at least one of GSM, CDMA, W-CDMA, UMTS, LTE, or LTE advanced, and wherein the second air interface type may include at least one of GSM, CDMA, W-CDMA, UMTS, LTE, or LTE advanced. In some embodiments, the first set of data may include information regarding a distance or a time of flight of a wireless signal between a mobile device and the first antenna. In some embodiments, the second set of data may include information regarding a distance or a time of flight of a wireless signal between a mobile device and the second antenna.

In some embodiments of the apparatus, determining the location of the antenna supporting structure using combined data may include performing a multi-lateration or multi-angulation operation using at least some data from the first set of data and at least some data from the second set of data.

BRIEF DESCRIPTION OF THE DRAWINGS

Aspects of the present disclosure are illustrated by way of example. Non-limiting and non-exhaustive aspects are described with reference to the following figures, wherein like reference numerals refer to like parts throughout the various figures unless otherwise specified.

DETAILED DESCRIPTION

Figure 1:
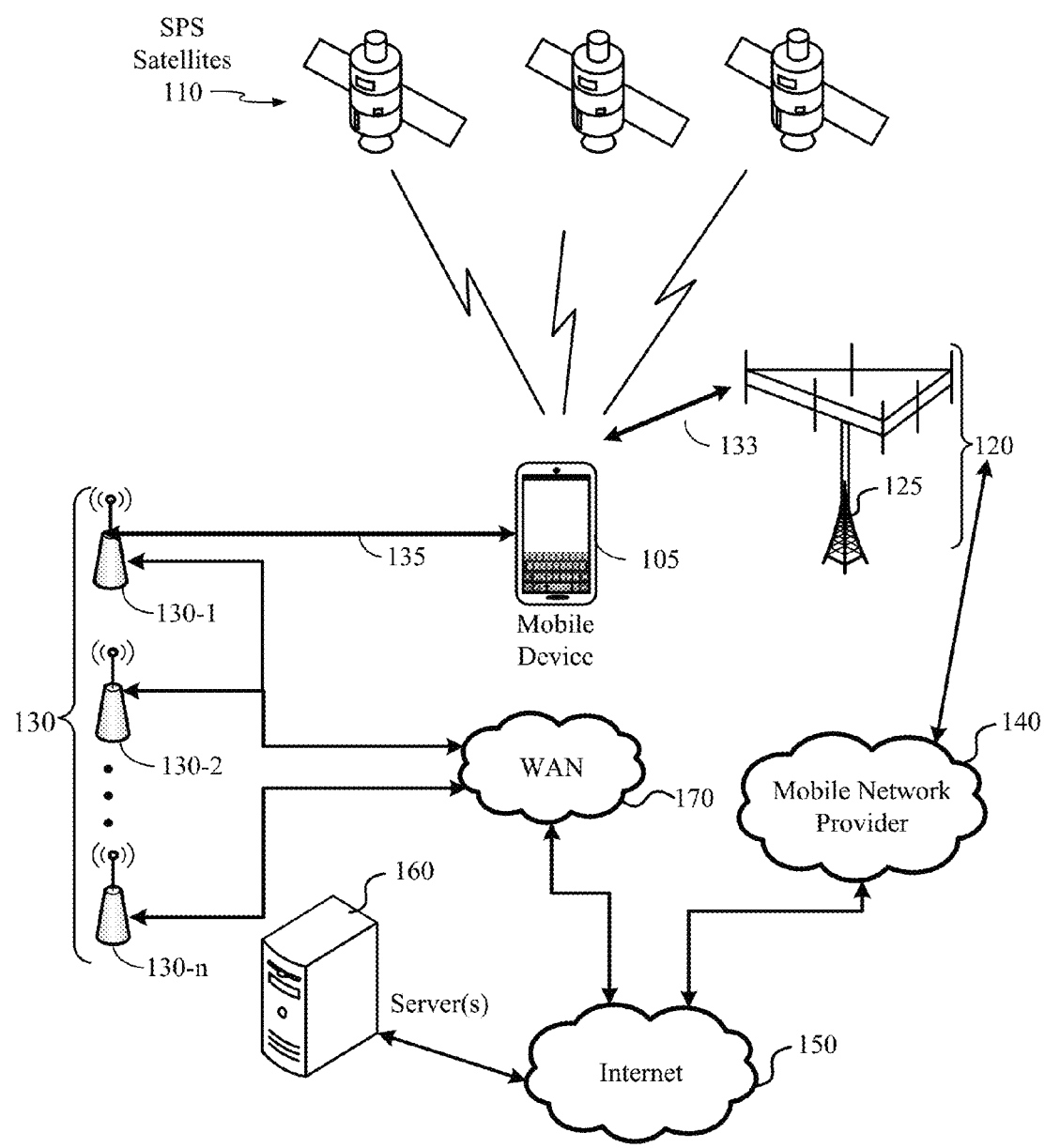
FIG. 1 is a simplified illustration of an example positioning system, according to an embodiment of the present disclosure.

Several illustrative embodiments will now be described with respect to the accompanying drawings, which form a part hereof. The ensuing description provides embodiment(s) only, and is not intended to limit the scope, applicability or configuration of the disclosure. Rather, the ensuing description of the embodiment(s) will provide those skilled in the art with an enabling description for implementing an embodiment. It is understood that various changes may be made in the function and arrangement of elements without departing from the spirit and scope of this disclosure.

Location information of a wireless communication antenna may be used in many applications. For example, the location of the antenna may allow a location-based service to determine the location of a mobile device. However, an antenna supporting structure (e.g., a cell tower for a base transceiver station or a building or other structure on which an antenna is attached) may be deployed in a particular location, the location information of which may not be known or readily accessible. Information regarding the locations of various antennas or antenna supporting structures may only be available to mobile service providers that use the antenna supporting structures or other entities responsible for the antenna supporting structures for various business, security, or practical reasons. In some circumstances, even mobile service providers may not be aware of the exact locations of many antenna supporting structures inside and/or outside of their own networks. Thus, it is often difficult to get complete and accurate information regarding the locations of various antennas and antenna supporting structures in wireless communication networks.

One way to estimate the location of an antenna supporting structure, and therefore the locations of antennas supported by the antenna supporting structure, is crowdsourcing a collection of data samples obtained from mobile devices. These data samples may include carrier-related timing information, for example, Global System for Mobile Communications (GSM) timing information, and received signal strength indication (RSSI). The data samples, including the timing information and/or RSSI, may be analyzed to estimate a distance between a mobile device and an antenna, based on, for example, the time of flight, round-trip time, or signal strength information. Based on estimated distances between multiple mobile devices and the antenna, the location of the antenna may be determined.

Currently, crowdsourcing-based antenna location determination is generally based on one particular air interface technology (i.e., type), such as one of GSM, Code Division Multiple Access (CDMA), Wideband-CDMA (W-CDMA), Universal Mobile Telecommunications System (UMTS), Long Term Evolution (LTE), or LTE Advanced etc. The accuracy of antenna location determination using some of these air interface technologies may not be accurate enough for some applications. Further, when a new antenna supporting structure is established or when an antenna supporting structure is moved, it may take time to crowdsource data from mobile devices and obtain an accurate location of the antenna supporting structure and the antennas it supports, especially in a rural area, where the collection of crowdsourcing data may often be very slow due to a low level of device penetration or use. It may take months or even a year in some instances to achieve a mature database.

Techniques disclosed herein improve the accuracy and speed of determining the location of an antenna supporting structure (e.g., a cell tower) using hybrid data associated with antennas used for different air interface types (AITs) but sharing a same physical tower and/or using aerial images. A tower location determined using one air interface technology or aerial images may be used as a starting point (seed) for determining the location of the antenna supporting structure. Based on this seed location, data associated with other air interface types or data from aerial images can be used to more accurately and more quickly determine the actual location of the antenna supporting structure. Crowdsourced data associated with an air interface technology (e.g., LTE) that allows for a more accurate reverse positioning of an antenna based on locations of mobile devices can be used to improve the accuracy of the antenna location derived from crowdsourced data associated with an air interface type (e.g., W-CDMA) that are less accurate for reverse positioning. As used herein, reverse positioning refers to determining the position of an antenna of, for example, an access point (AP) or a base transceiver station, based on the known locations of one or more mobile devices. Data from different air interface types and/or data from aerial images can also be combined to more quickly and more accurately determine the location of an antenna supporting structure.

Wireless communication systems may comprise wireless devices, APs, and base transceiver stations, which may allow the wireless devices to connect to a wired or wireless network using one or more wireless standards or air interface types. Wireless communication systems may also be used as a positioning system for determining the positions of the constituents of the system, such as a mobile device.

FIG. 1 is a simplified illustration of a positioning system 100, according to one embodiment of this disclosure, which may be used to implement various techniques described herein. Positioning system 100 may include at least some of a mobile device 105, Standard Positioning Service (SPS) satellites 110, base transceiver station(s) 120, a mobile network provider 140, access point(s) 130, server(s) 160, a wireless area network (WAN) 170, and the Internet 150. Mobile device 105 and/or other constituents of positioning system 100, such as server(s) 160, can process measurements and/or other data points to determine the position of mobile device 105. It should be noted that FIG. 1 provides only a generalized illustration of various components, any or all of which may be utilized as appropriate, and each of which may be duplicated as appropriate. Specifically, although only one mobile device 105 is illustrated, it will be understood that many mobile devices (e.g., hundreds, thousands, or more) may be utilized in positioning system 100. Similarly, positioning system 100 may include many base transceiver stations (similar to base transceiver station 120) and/or a larger or smaller number of APs 130. Connections between illustrated components may include additional (intermediary) components, direct or indirect connections, and/or additional networks. Furthermore, components may be rearranged, combined, separated, substituted, and/or omitted, depending on desired functionality. A person of ordinary skill in the art will recognize many modifications to the components illustrated.

Base transceiver station(s) 120 may include one or more antennas installed on an antenna supporting structure 125 for communicating with mobile device 105. Base transceiver station(s) 120 may also be communicatively coupled to mobile network provider 140 (e.g., a cellular network), which may be communicatively coupled with the Internet 150. Server(s) 160 can also be communicatively coupled with the Internet 150. Thus, mobile device 105 can communicate information with the server(s) 160, for example, by accessing the Internet 150 via the base transceiver station(s) 120 using a first communication link 133. Additionally or alternatively, because APs 130 and WAN 170 may also be communicatively coupled with the Internet 150, mobile device 105 may communicate with server(s) 160 using a second communication link 135.

As shown in FIG. 1, there may be a plurality of APs 130, some or all of which may be detected by mobile device 105. Although FIG. 1 shows mobile device 105 having a communication link (second communication link 135) with only one AP 130-1, 130-2, . . . , or 130-n, other configurations or embodiments may allow for multiple communication links with multiple APs 130. Additionally or alternatively, mobile device 105 may establish communication links with different APs 130 at different times.

Depending on desired functionality, a location of mobile device 105 may be determined in any of a variety of ways, by mobile device 105 and/or other devices in communication with the mobile device, which may be situation dependent. In some embodiments, server(s) 160 and/or other devices (not shown) remote to mobile device 105 may be used to implement positioning methods for supporting the positioning of mobile device 105, which may be referred to as a target mobile device, target device, or target. These positioning methods may include, for example, measurements by one or more mobile devices of wireless signals transmitted by SPS satellites 110, base transceiver station(s) 120 belonging to a wireless cellular network (e.g., mobile network provider 140), APs 130, and the like.

In addition (or as an alternative) to these position-determination methods, techniques described herein can utilize server(s) 160 that receive "crowdsourced" information from one or more mobile devices regarding one or more APs 130 and/or one or more base transceiver stations (similar to base transceiver station 120). Server(s) 160 may gather information from a plurality of mobile devices and determine the location of an AP or a base transceiver station. In some embodiments, the information may include RSSI and/or round trip time (RTT) measurements for each AP or each base receiver station. In some embodiments, server(s) 160 may wait to determine the location of an AP 130 or a base transceiver station 120 and add the determined location to a database until AP 130 or base transceiver station 120 has been identified by a threshold number of mobile devices (similar to mobile device 105) and/or by a threshold number of received crowdsourcing data samples.

Server(s) 160 may also determine the locations of AP(s) 130 and/or base transceiver station(s) 120 based on map data received, for example, from the Geographic Information System (GIS) and/or other databases such as Google Maps or Google Earth, alone or in combination with other data.

Mobile device(s) 105 and/or server(s) 160 of FIG. 1 may determine a location of a mobile device 105, a base transceiver station 120, or an AP 130, using various techniques based on the RSSI and/or time of flight or RTT measurements for each AP or base transceiver station. For example, multi-laterations or multi-angulations techniques, such as a trilateration or triangulation technique, may be used for determining the location of a mobile device 105, base transceiver station 120, or AP 130.

Figure 2:
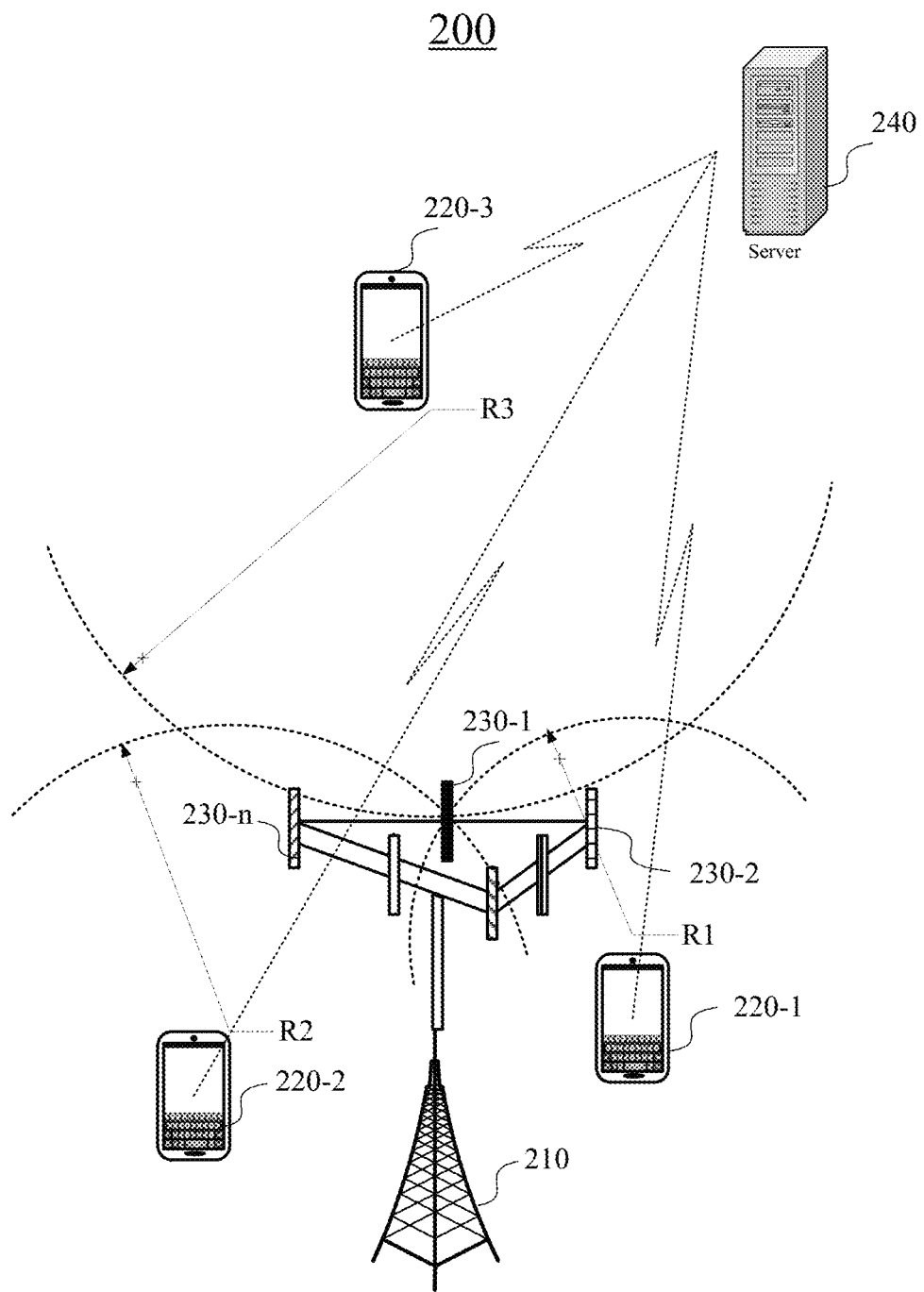
FIG. 2 illustrates an example system in which a location of an antenna or an antenna supporting structure may be determined.

FIG. 2 illustrates an example system 200 in which a location of an antenna or an antenna supporting structure may be determined. System 200 may include an antenna supporting structure 210, such as a cell tower, which may include a plurality of antennas 230-1, 230-2, . . . , and 230-n installed thereon. Each antenna of the plurality of antennas 230-1, 230-2, . . . , and 230-n may be for a different type of air interface technology, such as one of GSM, CDMA, W-CDMA, UMTS, LTE, LTE Advanced, or any other air interface technology for wireless communication. The plurality of antennas 230-1, 230-2, . . . , and 230-n may be for a same service provider or for different service providers.

Figure 3:
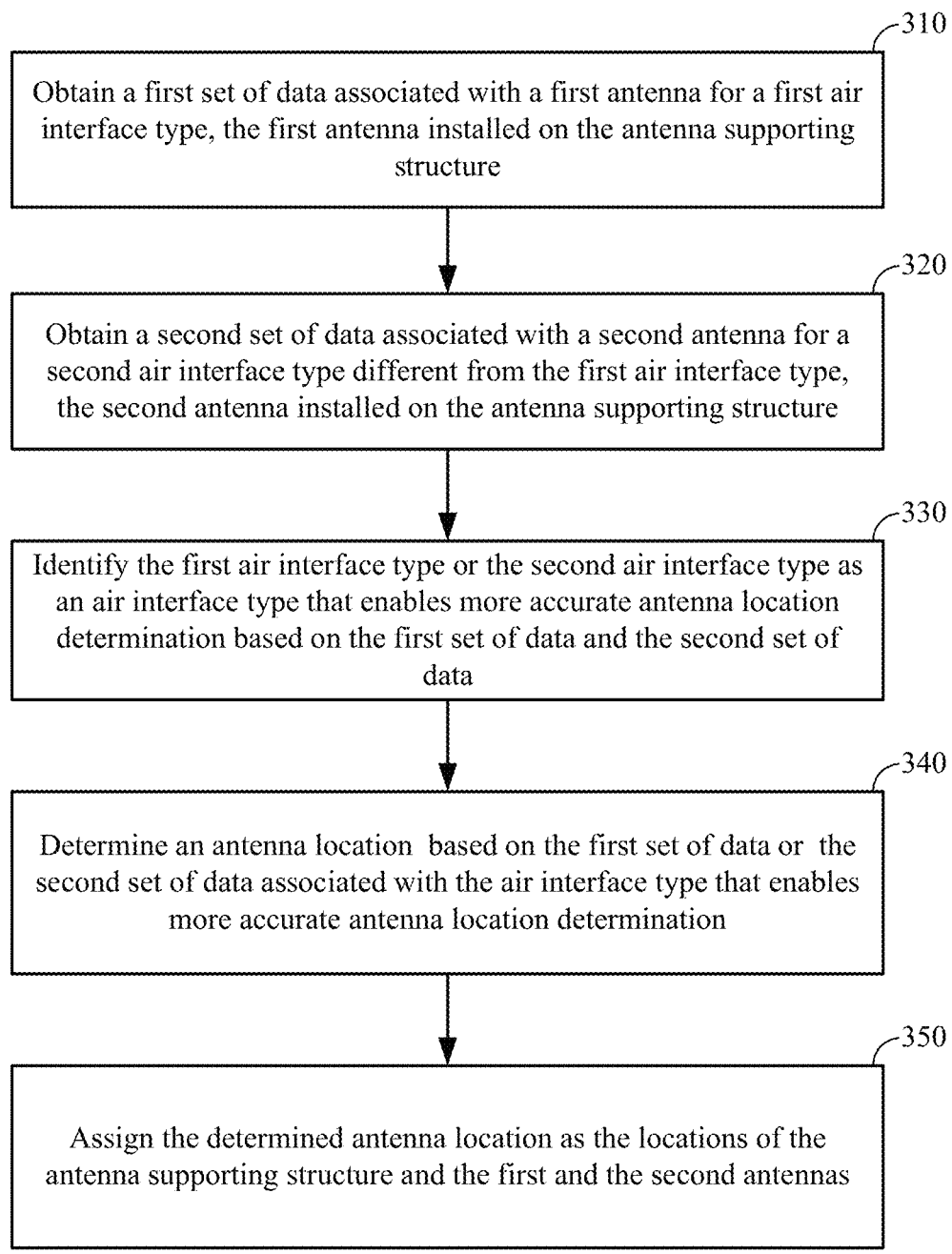
FIG. 3 is a flow chart illustrating an example method of determining a location of an antenna supporting structure and antennas on the antenna supporting structure.

As shown in FIG. 2, mobile devices 220-1, 220-2, and 220-3 may communicate with antenna 230-1 using a same air interface type as described above. Mobile devices 220-1, 220-2, and 220-3 may measure, for example, the RSSI or RTT of signals from antenna 230-1. Mobile devices 220-1, 220-2, and 220-3 may send the measured information and their location information to a server 240. Alternatively, server 240 may determine the locations of mobile devices 220-1, 220-2, and 220-3 based on the information that server 240 has gathered. Based on the RSSI or RTT of signals from antenna 230-1 measured by mobile devices 220-1, 220-2, and 220-3, the distance between antenna 230-1 and each of mobile devices 220-1, 220-2, and 220-3 may be determined. For example, the distance between antenna 230-1 and mobile device 220-1 may be determined to be R1, the distance between antenna 230-1 and mobile device 220-2 may be determined to be R2, and the distance between antenna 230-1 and mobile device 220-3 may be determined to be R3. Based on the locations of mobile devices 220-1, 220-2, and 220-3 and the distances R1, R2, and R3, server 240 or a mobile device 220 may determine the location of antenna 230-1 using, for example, a trilateration technique as shown in FIG. 3, where the intersection of a first circle centered at the location of mobile device 220-1 with a radius R1, a second circle centered at the location of mobile device 220-2 with a radius R2, and a third circle centered at the location of mobile device 220-3 with a radius R3 may be determined to be the location of antenna 230-1.

Location of other antennas 230-2, . . . , and 230-n may be determined in a similar manner using information measured by mobile devices communicating with antennas 230-2, . . . , and 230-n using corresponding air interface technologies. As described above, the accuracy of antenna location determination using different air interface technologies may be different. For example, the accuracy of antenna location determination using the W-CDMA technology may not be as good as using the LTE technology. Further, as shown by FIG. 2, a different set of data may be used to determine the location of each antenna for a same service provider or different service providers, even if these antennas are installed on a same antenna supporting structure. Thus, when a new antenna supporting structure is established or when an antenna supporting structure is moved, it may take time to obtain accurate locations of the antenna supporting structure and the antennas it supports at least because the collection of crowdsourcing data may often be very slow due to a low level of device penetration or use. As a result, it may take months or a year to achieve a mature database.

As shown in FIG. 2, antennas for wireless cells of different air interface types (e.g., GSM, W-CDMA, and LTE) from a same service provider often share a same physical antenna supporting structure. Multiple carriers may also share same antenna supporting structure due to, for example, local regulations and/or real estate restrictions. Thus, data associated with antennas for different air interface types but sharing a same antenna supporting structure may be combined to determine the location of the antenna supporting structure, and therefore the locations of the antennas supported by the antenna supporting structure, more quickly and more accurately. For example, the location of a first antenna associated with a first air interface type for a carrier may be determined using data associated with the first air interface type. The location of the first antenna can then be used as the location of a second antenna associated with a second air interface type that shares an antenna supporting structure with the first antenna.

There may be various ways to determine whether or infer that some antennas are on a same antenna supporting structure. For example, such information may be found in public records, such as city records. In situations where such information is not available otherwise, an approximate location of a first antenna associated with a first air interface type for one carrier determined using data associated with the first air interface type may be cross-checked with an approximate location of a second antenna associated with a second air interface type for the same carrier determined using data associated with the second air interface type to determine whether they are on the same antenna supporting structure. If the determined locations of the two antennas are close enough, they may be on the same antenna supporting structure. In one embodiment, if the distance between the computed locations of two antennas is below a threshold, it can be determined or inferred that the antennas are on the same antenna supporting structure. In one example, antennas for the same carrier may be on the same tower if they are determined to be less than 30 meters apart. The threshold can depend on the air interface type of the respective antenna. For example, the threshold for antennas associated with a WLAN AP may be considered to be attached to the same antenna supporting structure may be relatively low compared to the threshold for antennas associated with cellular base transceiver stations. In some embodiments, the approximate locations of different antennas may be ranked or grouped based on proximity and carrier. Locations that are clustered and are associated with a same carrier are more likely to be the location of an antenna supporting structure.

After it is determined or inferred that two or more antennas are on the same antenna supporting structure, various techniques may be used to determine the locations of the antenna supporting structure and the antennas supported by the antenna supporting structure more quickly and more accurately.

FIG. 3 is a flow chart 300 illustrating an example method of determining a location of an antenna supporting structure and antennas on the antenna supporting structure. At block 310, a first set of data associated with a first antenna installed on the antenna supporting structure may be obtained, for example, by a server from a plurality of mobile devices in communication with the first antenna. The first antenna may be used for a first air interface type, such as GSM, W-CDMA, or LTE. The first set of data may include distance, signal strength, and/or timing information indicating a distance between each mobile device of the plurality of mobile devices and the first antenna, such as RSSI or RTT information as described above, or distance information determined based on the RSSI or RTT information. The first set of data may also include information regarding the first air interface type, for example, the data identifying the first air interface type, the positioning method used to determine the distances, and corresponding accuracy information regarding the accuracy of the determined distances. Based on the determined distances between each of the plurality of mobile devices and the first antenna, a location of the first antenna may be computed.

At block 320, a second set of data associated with a second antenna installed on the antenna supporting structure may be obtained, for example, by a server from a plurality of mobile devices in communication with the second antenna. The second antenna may be used for a second air interface type different from the first air interface type. The second set of data may include information indicating a distance between each mobile device of the plurality of mobile devices and the second antenna as described above. The second set of data may also include information regarding the second air interface type, for example, the data identifying the second air interface type, the positioning method used to determine the distances, and corresponding accuracy information regarding the accuracy of the determined distances. Based on the determined distances between each of the plurality of mobile devices and the second antenna, a location of the second antenna may be computed. As noted above, if the location of the first and second antenna are found to be close, in some embodiments, it may be inferred that the two antenna are attached to the same antenna supporting structure.

At block 330, in one embodiment, the air interface type that allows for more accurate antenna location determination may be identified and selected from the first air interface type and the second air interface type, based on the first set of data and the second set of data. For example, if the first interface type is LTE and the second air interface type is W-CDMA, the first air interface type (i.e., LTE) may be selected.

At block 340, an antenna location may be determined based on the air interface type that allows for more accurate antenna location determination. For example, if the first air interface type is LTE and the second air interface type is W-CDMA, and it is determined that LTE-based distance measurements are more accurate that W-CDMA-based measurements, the first set of data for the first air interface type (i.e., LTE) may be used to determine the antenna location. In various embodiments, the antenna location may be represented by, for example, geodetic latitude, longitude, and altitude (LLA) coordinates, xyz coordinates, Earth-Centered Inertial (ECI) coordinates, or Earth-Centered-Earth-Fixed (ECEF) coordinates.

At block 350, the determined antenna location may be assigned as the common location of the antenna supporting structure and the first and the second antennas.

The operations of flow chart 300 may be performed by a server, such as server 240 of FIG. 2, or by a mobile device, such as mobile devices 220 of FIG. 2.

In some embodiments, the location of a first antenna associated with a first air interface type can be used as a seed or candidate location for determining the location of a second antenna that is associated with a second air interface type different from the first air interface type and is known or inferred to be on a same antenna supporting structure as the first antenna. In this way, the process of determining the location of the second antenna may converge significantly faster using the seed or candidate location that is close to the actual location as the initial location.

Figure 4:
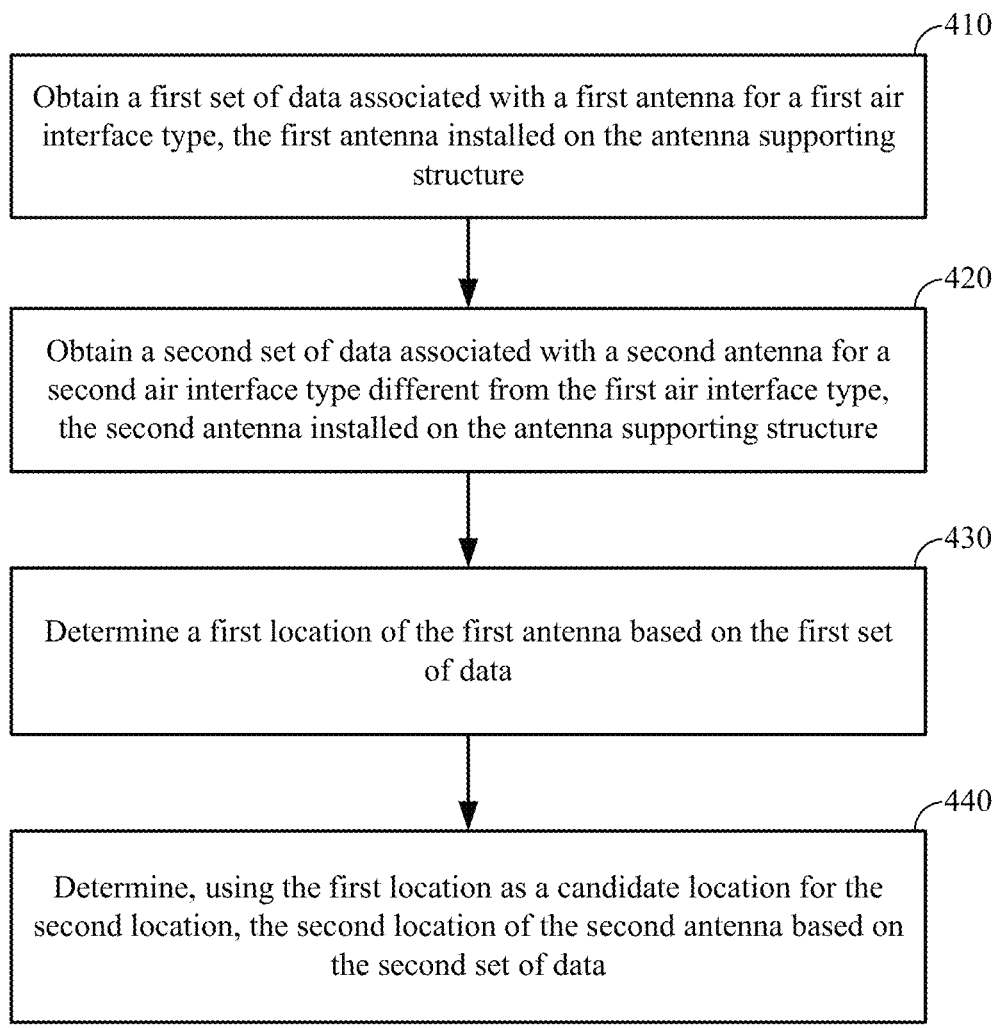
FIG. 4 is a flow chart illustrating another example method of determining a location of an antenna supporting structure and antennas on the antenna supporting structure.

FIG. 4 is a flow chart illustrating another example method of determining a location of an antenna supporting structure and antennas on the antenna supporting structure. At block 410, a first set of data associated with a first antenna installed on the antenna supporting structure may be obtained, for example, by a server from a plurality of mobile devices in communication with the first antenna. The first antenna may be used for a first air interface type, such as GSM, W-CDMA, or LTE. At block 420, a second set of data associated with a second antenna installed on the antenna supporting structure may be obtained, for example, by a server from a plurality of mobile devices in communication with the second antenna. The second antenna may be used for a second air interface type different from the first air interface type. The operations at blocks 410 and 420 of FIG. 4 may be similar to the operations at blocks 310 and 320 of FIG. 3 described above. At block 430, a first location of the first antenna may be determined based on the first set of data using, for example, multi-lateration or multi-angulation techniques as described above with respect to FIG. 2.

At block 440, the first location may be used as a candidate location for determining a second location of the second antenna based on the second set of data. For example, the candidate location may be used for faster convergence of position estimation as a position estimation technique generally starts with an initial position estimation (i.e. a seed) and iteratively updates the position estimation by minimizing a discrepancy between the position estimation and measurement results. If the initial position estimation is close to the actual location, fewer iterations may be taken before a convergence is reached, and the position estimation technique may have a lower probability of divergence (no solution), which may happen due to measurement noises. Additionally, the candidate location (i.e., the seed) may be used for sanity-checking of the final position estimation, which would generally be in the vicinity of the seed. For example, if the final position estimation and the seed are too far away from each other (e.g., at or farther than 5 km), the seed may be incorrect (e.g., the seed may be for a different antenna support structure) or the final position estimation may be incorrect (e.g., the noise of the measurement for an air interface type may be too large). In the former case, it may be determined that the second antenna for the second air interface type is not on the same antenna supporting structure as the first antenna, and is likely associated with a different antenna supporting structure; thus the first antenna and the second antenna may be disassociated and/or a new antenna supporting structure may be associated with the second antenna. In the latter case, the position estimation of the second antenna may not be broadcast to mobile devices, or may be broadcast to mobile devices but may be marked as less reliable, until antenna positioning results consistently show the first and second antenna are likely to be close to each other and an inference that they are both on the same antenna supporting structure can be justified.

In some embodiments, even if antennas are on the same antenna supporting structure, they may have different locations, particularly in altitude. In such embodiments, the location of a first antenna may be used as a seed to accelerate the computation of the location of a second antenna on the same antenna supporting structure, and the location of the second antenna may differ from the location of the first antenna by, for example, several meters.

In some embodiments, the locations of the two or more antennas on the same antenna supporting structure can also be used to determine a more accurate location of the antenna supporting structure. For example, if a first location of a first antenna associated with a first air interface type is determined and it is known that there is an error of less than 30 meters for the first location because of the air interface type used, a second location of a second antenna associated with a second air interface type is determined and it is known that there is an error of less than 10 meters for the second location, and a third location of a third antenna associated with a third air interface type is determined and it is known that there is an error of less than 20 meters for the third location, a more accurate location of the antenna supporting structure may be determined based on such information.

Figure 5:
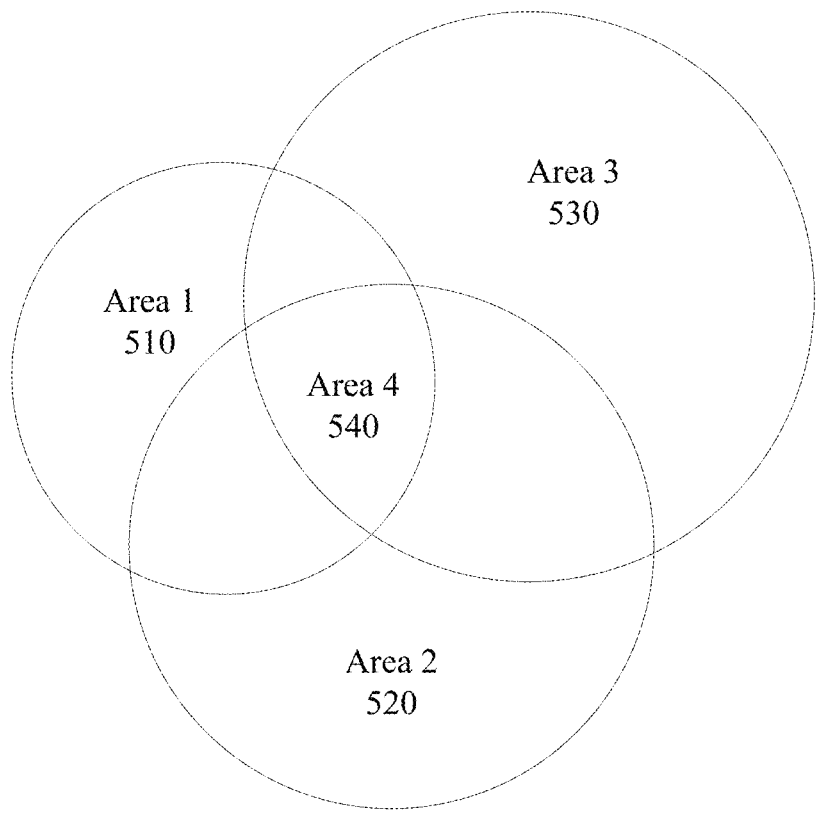
FIG. 5 illustrates an example method of determining a location of an antenna supporting structure based on locations of two or more antennas on the antenna supporting structure.

FIG. 5 illustrates an example method of determining a location of an antenna supporting structure based on locations of two or more antennas on the antenna supporting structure. In FIG. 5, it may be estimated that a first antenna associated with a first air interface type is located within a first candidate region represented by Area 1 (510) due to the errors associated with the measurements of the strength or timing of the signals of the first air interface type and/or the locations of the mobile devices that make the measurements. Area 1 (510) may be, for example, determined based on a first set of data. Similarly, a second antenna associated with a second air interface type may be estimated, based on a second set of data, to be located within a second candidate region represented by Area 2 (520) due to various errors, and a third antenna associated with a third air interface type may be estimated, based on a third set of data, to be located within a third candidate region represented by Area 3 (530). The location of the antenna supporting structure that supports the first, second, and third antennas may then be determined to be within the overlapped Area 4 (540). As such, the locations of the first, second, and third antennas may be more accurately determined to be within Area 4 (540) as well. Hence, in some embodiments, determining the location of the antenna supporting structure using combined data can include using the first, second, and third sets of data to determine the overlapped Area 4 (540) as the location of the antenna supporting structure.

It is noted that locations of two or more antennas on the same antenna supporting structure may be used to more accurately determine a location of an antenna supporting structure. For example, where there is data for only two antennas (for example, the first and second antenna), determining the location of the antenna supported structure using combined data can include using the first and second sets of data to determine an overlapped area of between Area 1 (510) and Area 2 (520).

In some cases, crowdsourcing data from different air interface types may be combined to determine a location of an antenna supporting structure. For example, data from two users of GSM technology and a user of LTE technology may be used to determine a location of an antenna supporting structure where both the GSM antenna and the LTE antenna are installed. This allows for the location of the antenna supporting structure to be determined as early as possible when only limited data is available for one air interface type. Furthermore, since more data may be available when data from different air interface types is combined, the accuracy of the determined location may be improved.

Figure 6:
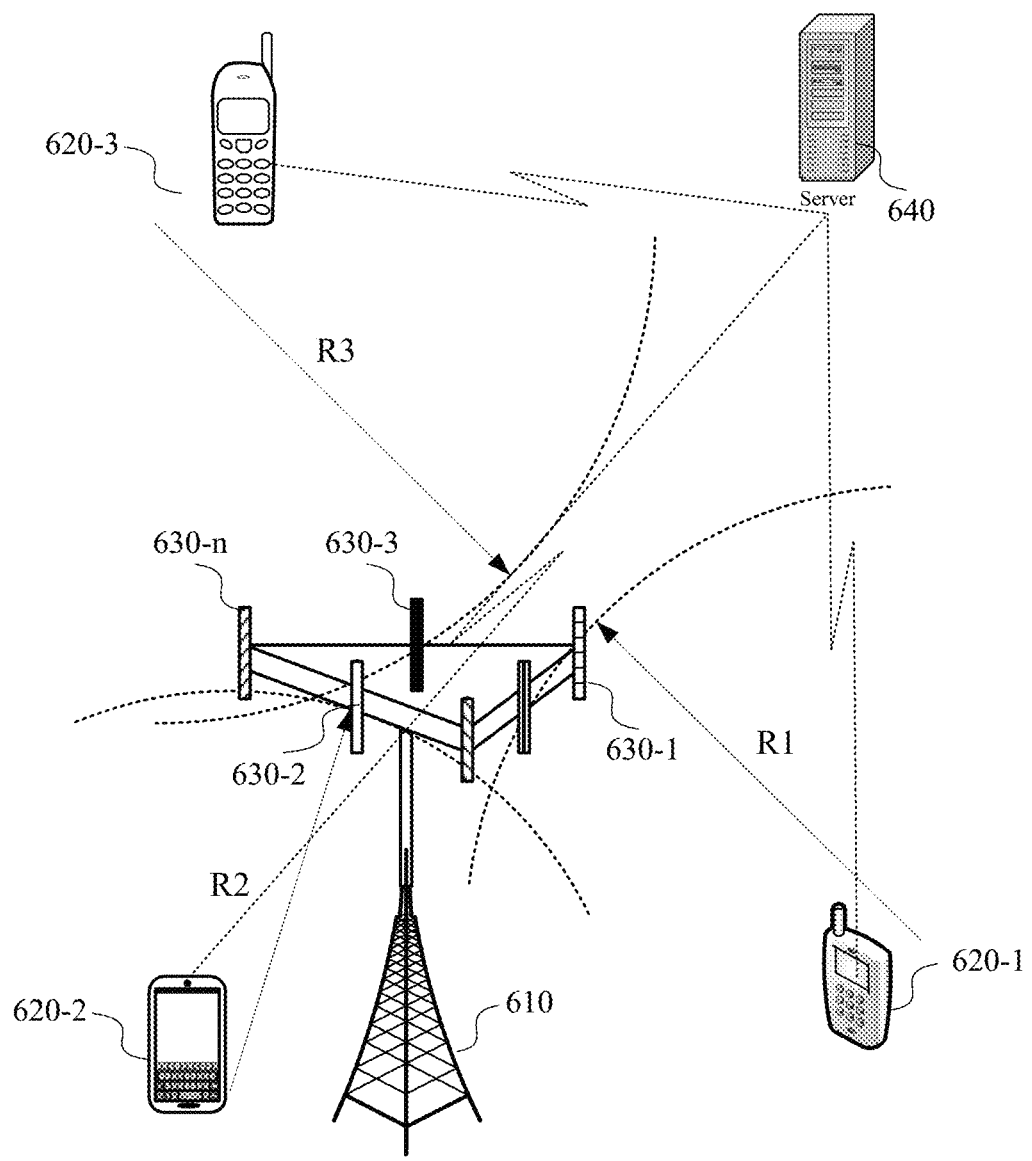
FIG. 6 illustrates an example system in which a location of an antenna supporting structure may be determined using data associated with different air interface types.

FIG. 6 illustrates an example system 600 in which a location of an antenna supporting structure 610 may be determined using data associated with different air interface types. System 600 may include antenna supporting structure 610 that supports a plurality of antennas 630-1, 630-2, 630-3, . . . , and 630-n. At least some of the plurality of antennas 630-1, 630-2, 630-3, . . . , and 630-n may be associated with different air interface types. For example, one antenna of the plurality of antennas may be used for GSM communication, another antenna of the plurality of antennas may be used for W-CDMA communication, and so on.

A first mobile device 620-1 may be configured to communicate with antenna 630-1 using a first air interface type, a second mobile device 620-2 may be configured to communicate with antenna 630-2 using a second air interface type, and a third mobile device 620-3 may be configured to communicate with antenna 630-3 using a third air interface type. The first, second, and third air interface types may include a same air interface type, two different air interface types, or three different air interface types. Each of mobile devices 620-1, 620-2, and 620-3 may measure its distance from antennas 630-1, 630-2, and 630-3, respectively, by measuring, for example, the signal strength or time of flight of wireless signals from the respective antenna as described above. Each of mobile devices 620-1, 620-2, and 620-3 may send the information indicating its distance from the respective antenna to a server 640. Mobile devices 620-1, 620-2, and 620-3 may also send information indicating the locations of mobile devices 620-1, 620-2, and 620-3 to server 640.

Server 640 may determine the location of antenna supporting structure 610 using, for example, a multi-lateration technique as described above, based on the received information indicating the distances between mobile devices 620-1, 620-2, and 620-3 and their corresponding antennas 630-1, 630-2, and 630-3, and the locations of mobile devices 620-1, 620-2, and 620-3 received from mobile devices 620-1, 620-2, and 620-3 or determined by server 640 based on collected information.

It is noted that even though FIG. 6 illustrates determining the location of an antenna supporting structure using information regarding three different antennas for three different air interface types, information regarding one antenna or two antennas for one or more air interface types may be used to determining the location of an antenna supporting structure. For example, information indicating the distance of one mobile device to a first antenna for a first air interface type and the distances between a second antenna for a second air interface type and two mobile devices may be used to determine the location of the antenna supporting structure that supports the first and the second antennas.

Figure 7:
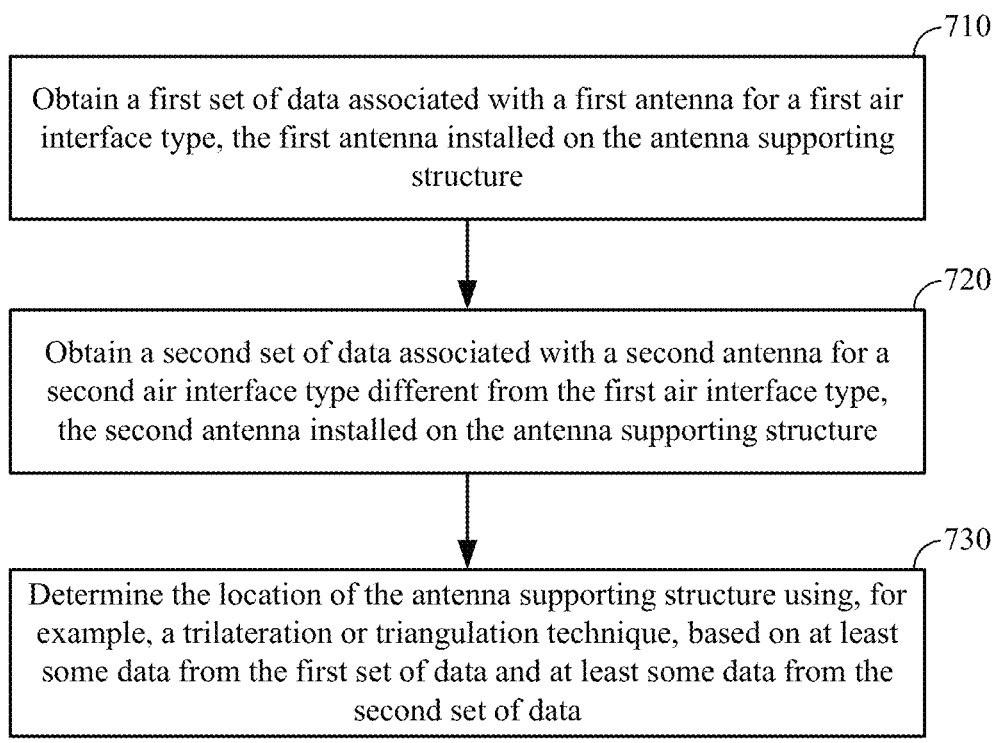
FIG. 7 is a flow chart illustrating an example method of determining a location of an antenna supporting structure using data associated with different air interface types.

FIG. 7 is a flow chart illustrating an example method of determining a location of an antenna supporting structure using data associated with different air interface types. At block 710, a first set of data associated with a first antenna installed on the antenna supporting structure may be obtained as described above with respect to block 310 of FIG. 3, where the first antenna may be used for a first air interface type. At block 720, a second set of data associated with a second antenna installed on the antenna supporting structure may be obtained as described above with respect to block 320 of FIG. 3, where the second antenna may be used for a second air interface type different from the first air interface type. At block 730, the location of the antenna supporting structure may be determined using, for example, a trilateration or triangulation technique as described above, based on at least some data from the first set of data and at least some data from the second set of data as described above with respect to FIG. 6. For example, data indicating the distance of a first mobile to the first antenna for the first air interface type and the distances between the second antenna for the second air interface type and two mobile devices may be used to determine the location of the antenna supporting structure that supports the first and the second antennas. Hence, for example, determining the location of the antenna supporting structure using combined data comprising the first set of data and the second set of data can include using at least some data from the first set of data and at least some data from the second set of data to perform trilateration or triangulation.

Figure 8:
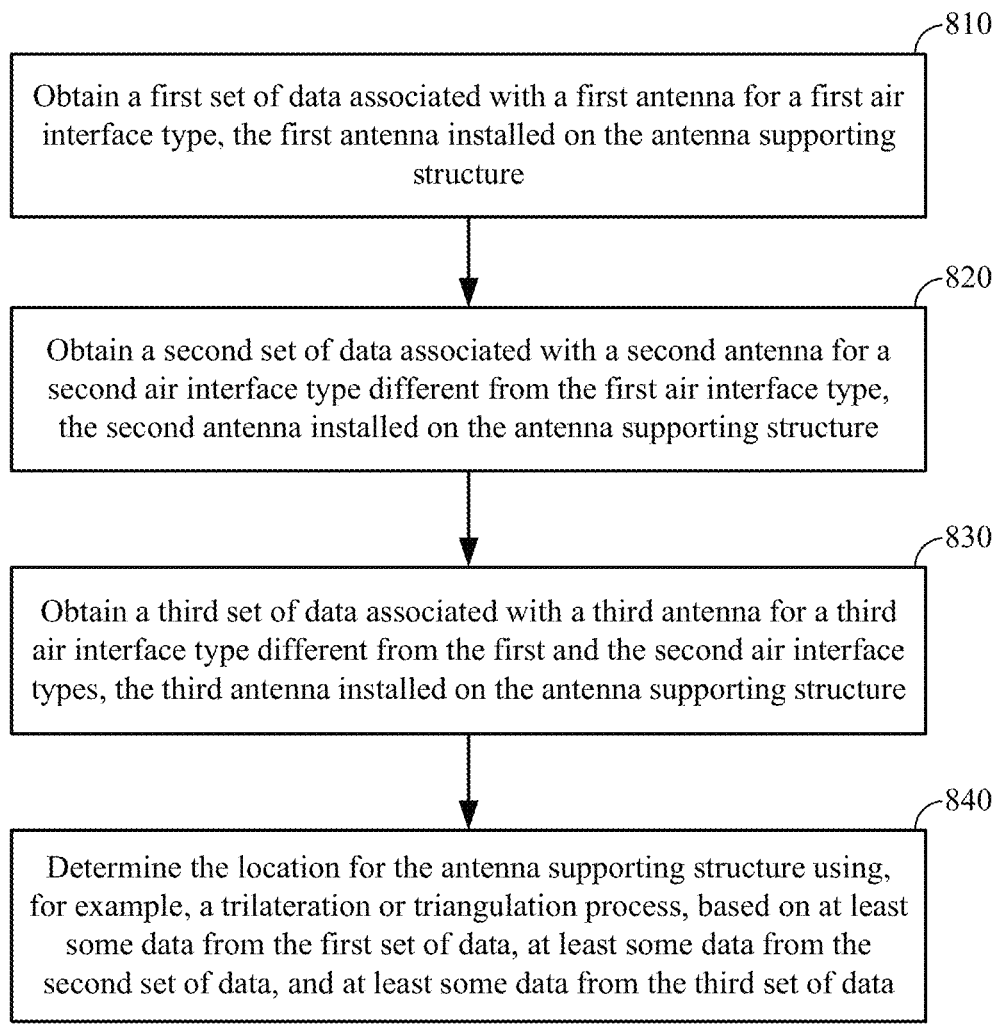
FIG. 8 is a flow chart illustrating another example method of determining a location of an antenna supporting structure using data associated with different air interface types.

FIG. 8 is a flow chart illustrating another example method of determining a location of an antenna supporting structure using data associated with different air interface types. At block 810, a first set of data associated with a first antenna installed on the antenna supporting structure may be obtained as described above with respect to, for example, block 310 of FIG. 3 and block 710 of FIG. 7, where the first antenna may be used for a first air interface type. At block 820, a second set of data associated with a second antenna installed on the antenna supporting structure may be obtained as described above with respect to, for example, block 320 of FIG. 3 and block 720 of FIG. 7, where the second antenna may be used for a second air interface type different from the first air interface type. At block 830, a third set of data associated with a third antenna installed on the antenna supporting structure may be obtained as described above with respect to blocks 810 and 820, where the third antenna may be used for a third air interface type different from the first and the second air interface types. At block 840, the location of the antenna supporting structure may be determined using, for example, a trilateration or triangulation technique as described above, based on at least some data from the first set of data, at least some data from the second set of data, and at least some data from the third set of data as described above with respect to FIG. 6. Hence, for example, determining the location of the antenna supporting structure using combined data comprising the first set of data, the second set of data, and the third set of data can include using at least some data from the first set of data, at least some data from the second set of data, and at least some data from the third set of data to perform trilateration or triangulation.

Another aspect of this disclosure is a technique for determining a location of an antenna supporting structure using aerial images, such as Google Earth images, and the associated metadata indicating the coordinates of the location of the aerial image. Metadata associated with an aerial image may also enable the computation of a geographic location of objects captured in the image. For example, computer-based imaging processing techniques, such as computer-version-based object recognition techniques, may be used to determine whether an antenna supporting structure, such as a cell tower, is in an image, and to determine the location of the cell tower if the cell tower is in the image. The accuracy using this technique may be as good as within 5 meters or better.

Figure 9:
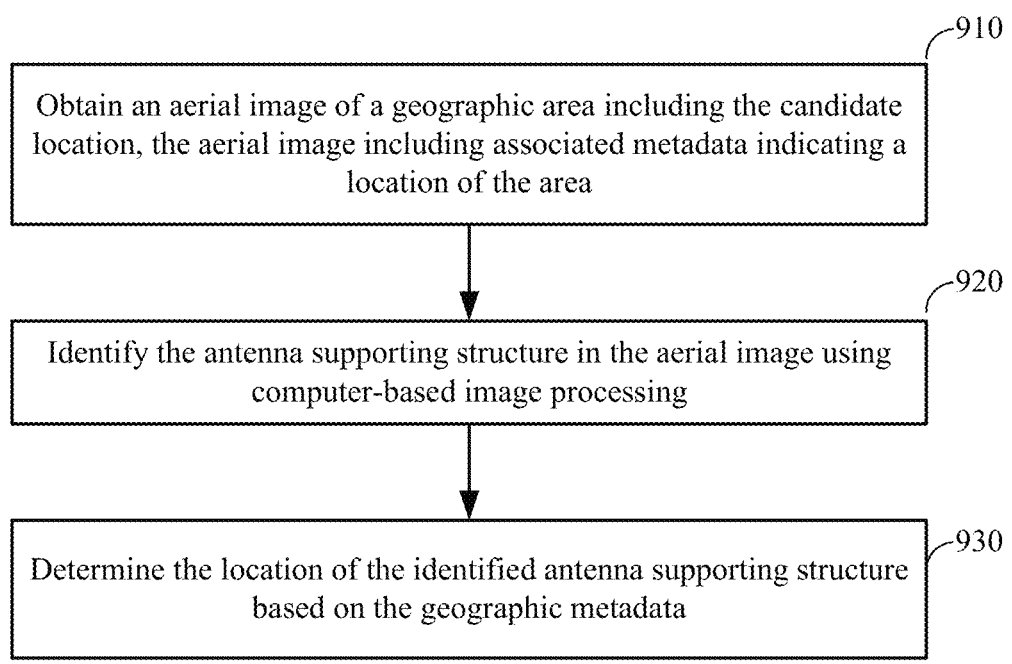
FIG. 9 is a flow chart illustrating an example method of determining a location of an antenna supporting structure using an aerial image.

FIG. 9 is a flow chart illustrating an example method of determining a location of an antenna supporting structure using computer-based image processing techniques. At block 910, an aerial image of a geographic area including an antenna supporting structure may be obtained by accessing, for example, satellite images such as Google Maps images, Google Earth images, or satellite images otherwise captured by a satellite, or images captured by an aerial vehicle, such as an airplane, an airship or blimp, or an unmanned aerial vehicle (UAV or drone). The aerial image may include associated geographic metadata indicating a geographic location of the aerial image, an point somewhere in the image, and/or geographic area corresponding to the aerial image. As described further below, the geographic metadata can also enable the computation of a geographic location of objects captured in the image, including, for example, antenna supporting structure in the aerial image.

At block 920, the antenna supporting structure in the aerial image may be identified using an appropriate computer-based image processing and feature extraction technique and/or an object recognition technique known to a person skilled in the art, such as, for example, edge detection, feature matching, or artificial neural network. For example, the images of known types of antenna or antenna supporting structure, and common antenna arrangements may be used to compare with objects in the aerial images to identify possible antenna supporting structure. As another example, machine learning and object classification techniques may be used to identify the antenna supporting structure. For example, computer vision features such as local binary patterns may be computed and a cascade classifier may be used to determine if an antenna is found within the image based on the computed local binary patterns.

At block 930, the location of the antenna supporting structure identified using the computer-based image processing may be determined based on the geographic metadata. In one embodiment, a relative location of the identified antenna supporting structure in the geographic area may be determined based on the location in the aerial image where the antenna supporting structure is identified. For example, if the aerial image covers an area of 100×100 m$^2$ (i.e., x∈[0:100] and y∈[0:100]), an antenna supporting structure may be identified in, for example, a region defined by x∈[15:25] and y∈[40:50] using the computer-based image processing. Based on the relative location of the identified antenna supporting structure in the geographic area and using the geographic metadata associated with the aerial image, the location of the antenna supporting structure may be determined. For example, based on the latitude and longitude coordinates of the geographic area (in one example, latitude and longitude of the four corners of the image) of the aerial image in the metadata and the relative location of the antenna supporting structure in the geographic area, the latitude and longitude coordinates of the location of the antenna supporting structure may be determined. In some embodiments, the latitude and longitude coordinates of the location of the antenna supporting structure may be retrieved from, for example, Google Maps or Google Earth by querying the location of the identified antenna supporting structure as illustrated in FIG. 10C and described in more detail below.

Figure 10A:
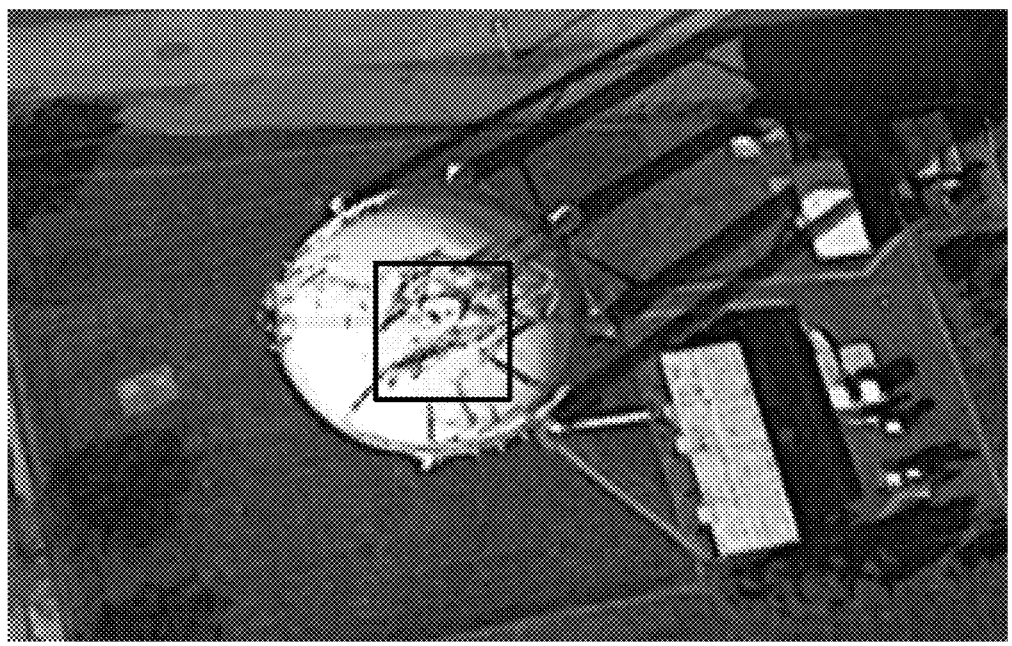
FIG. 10A is an aerial image of an example antenna supporting structure.

FIG. 10A is an example aerial image of an area including an example antenna supporting structure. The example aerial image of FIG. 10A may be retrieved from, for example, Google Earth images based on, for example, a candidate location determined by other techniques disclosed herein. The example aerial image of FIG. 10A shows a water tower with wireless communication antennas installed on top of the water tower. A computing system may process the example aerial image of FIG. 10A using computer-based image processing as described above with respect to FIG. 9 to identify an antenna supporting structure, for example, by extracting candidate features of an antenna or an antenna supporting structure, and comparing and/or classifying the extracted candidate features with known features of antennas or antenna supporting structures to determine whether and where an antenna or an antenna supporting structure is present in the aerial image.

Figure 10B:
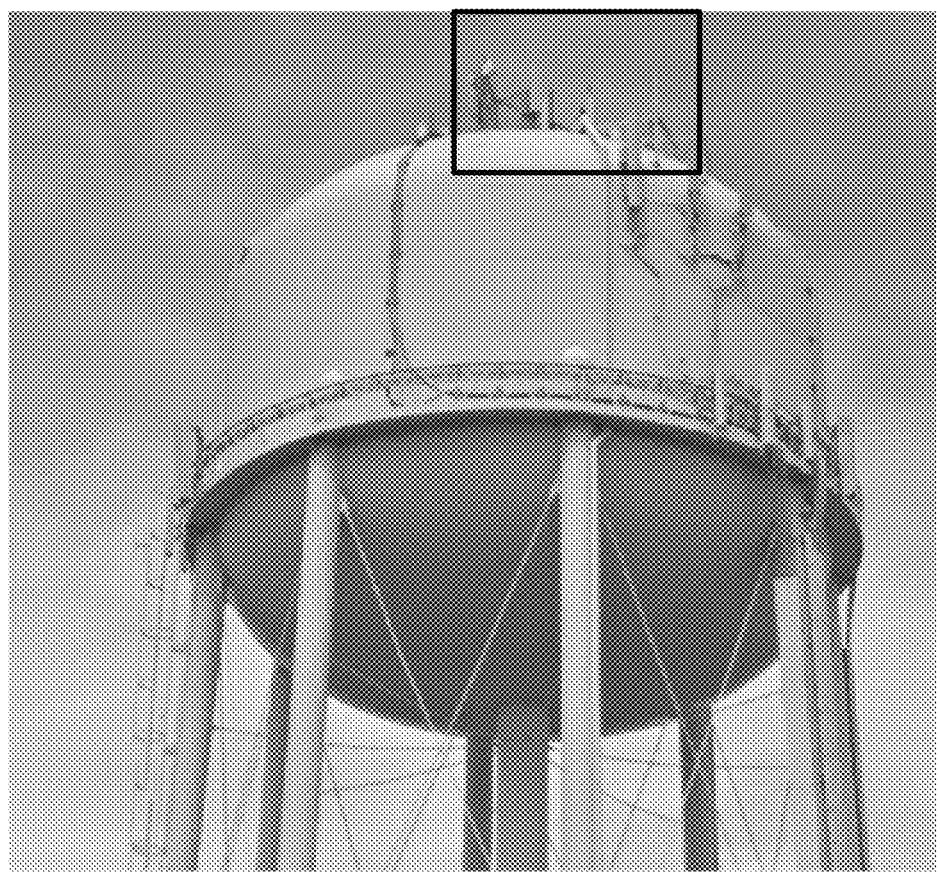
FIG. 10B is a street view of the example antenna supporting structure of FIG. 10A.

FIG. 10B is a street view of the example antenna supporting structure of FIG. 10A. The computing system may use the street view of the example antenna supporting structure to identify the antenna supporting structure or verify that the antenna supporting structure identified using the computer-based image processing from the aerial image is indeed an antenna supporting structure. For example, in some examples, a computer-based three-dimensional object recognition technique may be used to identify an antenna supporting structure.

Figure 10C:
FIG. 10C illustrates a determined location of the example antenna supporting structure of FIG. 10A.

FIG. 10C illustrates a determined location of the example antenna supporting structure of FIG. 10A identified using the computer-based image processing. For example, the computing system may retrieved the location of the identified example antenna supporting structure shown in FIGS. 10A-10C by, for example, selecting the area of the image where the identified example antenna supporting structure is located and determining the location of the identified example antenna supporting structure using metadata associated with the area of the image as described above with respect to, for example, FIG. 9.

The techniques of antenna supporting structure location determination using data from various air interface types and the technique of antenna supporting structure location determination using imaging processing may also be combined to improve the accuracy and/or speed of the antenna supporting structure location determination. For example, in remote or rural areas where there are less wireless users and less construction structures, image processing may be a preferred way to determine the locations of antenna supporting structures. In some cases, processing images in a large area with various kinds of structures, such as an urban area, may be time consuming and less realistic. Thus, in areas such as an urban area, candidate locations of antenna supporting structures may first be determined using data associated with various air interface types as described above, and the image processing technique can then be used to determine the location of the antenna supporting structure with a better accuracy using images for only a small area including the candidate cell tower locations. In this way, less image processing may be needed and a best match method may be used to identify the antenna supporting structure because it is known that an antenna supporting structure is present. In some cases where the confidence level of object recognition using an aerial image may not be high enough, the location of the antenna supporting structure determined using data from various air interface types may be used to validate or invalidate the antenna supporting structure identified using the aerial images. For example, if a possible antenna supporting structure is identified in an aerial image of an area, but data from various air interface types indicates that no antenna is located in the area, the identified antenna supporting structure may be invalidated.

Figure 11:
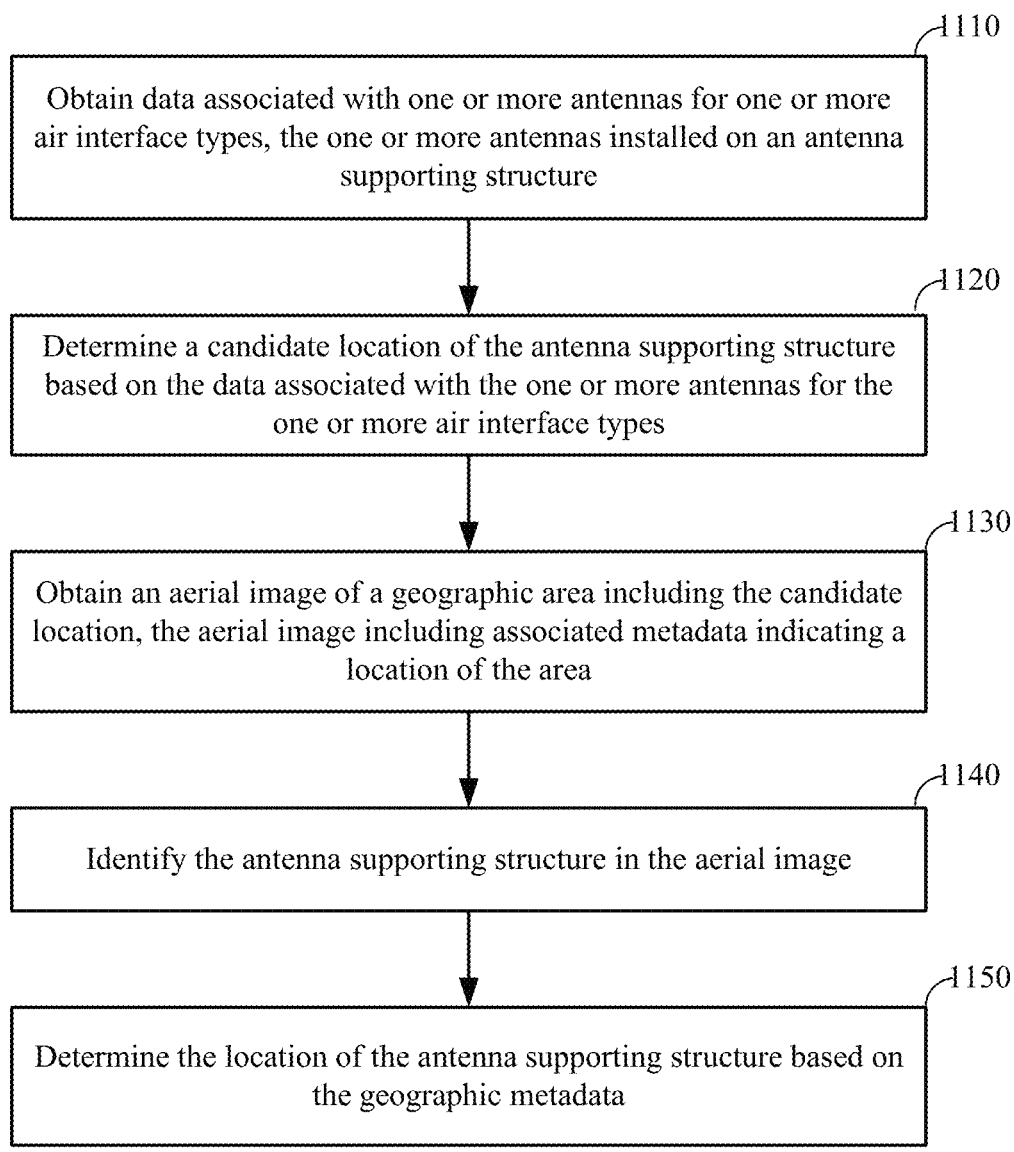
FIG. 11 is a flow chart illustrating an embodiment of a method for determining a location of an antenna supporting structure using data associated with different air interface types and data associated with an image including the antenna supporting structure.

FIG. 11 is a flow chart illustrating an embodiment of a method for determining a location of an antenna supporting structure using data associated with different air interface types and data associated with an image including the antenna supporting structure. At block 1110, data associated with one or more antennas for one or more air interface types may be obtained as described above with respect to FIGS. 3, 4, 7, and 8. The one or more antennas are installed on the antenna supporting structure. In one embodiment, obtaining data associated with one or more antennas for one or more air interface types can include obtaining a first set of data associated with a first antenna for a first air interface type and obtaining a second set of data associated with a second antenna for a second air interface type different from the first air interface type. The location of the antenna supporting structure can be determined using combined data comprising the first set of data and the second set of data.

At block 1120, a candidate location of the antenna supporting structure may be determined based on the data associated with the one or more antennas for the one or more air interface types using, for example, any suitable technique as described above with respect to FIGS. 2-8. In one embodiment, for example when the data associated with the one or more antennas for the one or more air interface types includes a first set of data associated with a first antenna of a first air interface type and a second set of data associated with a second antenna of a second air interface type, using combined data (including at least some data from the first set and the second set) to determine the location of the antenna supporting structure can include determining a candidate location of the antenna supporting structure based on at least one of the first set of data or the second set of data. As described below, the candidate location can then be confirmed and/or improved using an aerial image At block 1130, an aerial image of a geographic area including the candidate location may be obtained by accessing, for example, satellite images such as Google Maps images, Google Earth images, or satellite images otherwise captured by a satellite, or images captured by an aerial vehicle, such as an airplane, an airship or blimp, or an unmanned aerial vehicle. The aerial image may include associated geographic metadata to enable the computation of a geographic location of objects captured in the image. In one example, the geographic metadata can indicate a geographic location of the geographic area.

At block 1140, the antenna supporting structure in the aerial image may be identified using any appropriate image processing and recognition techniques known to a person skilled in the art, as described above with respect to block 920 of FIG. 9.

At block 1150, the location of the antenna supporting structure may be determined based on the geographic metadata, as described above with respect to block 930 of FIG. 9.

In summary, data associated with one or more air interface types and/or aerial image data may be used to more quickly and more accurately determine the location of an antenna supporting structure that supports one or more antennas for the one or more air interface types.

Figure 12:
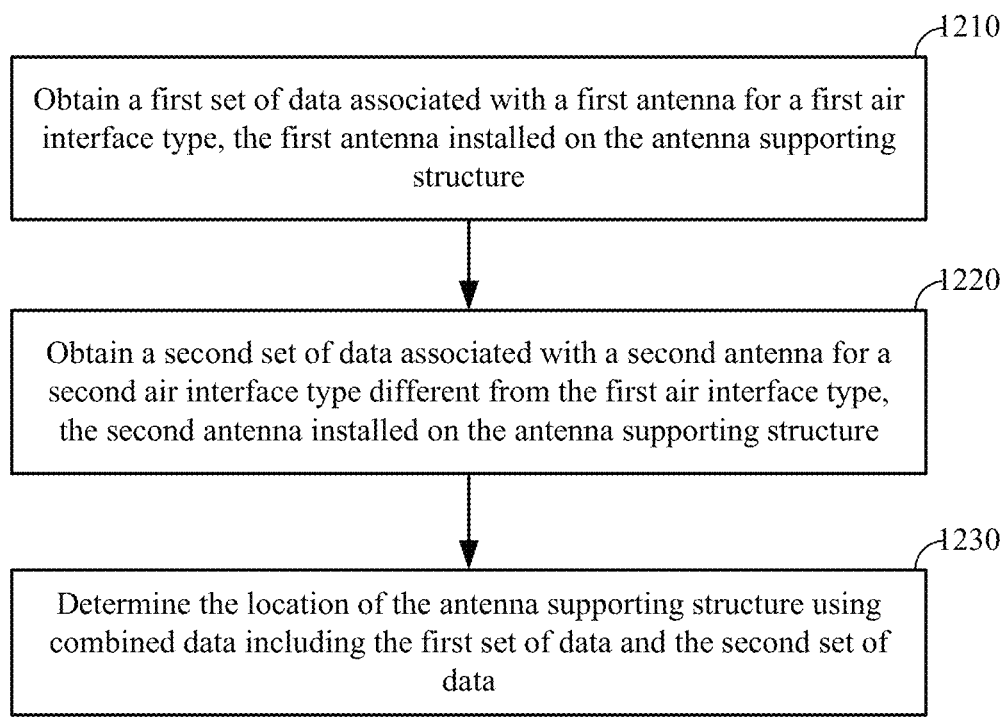
FIG. 12 is a flow chart illustrating an embodiment of a method for determining a location of an antenna supporting structure using data associated with different air interface types.

FIG. 12 is a simplified flow chart illustrating an embodiment of a generalized method for determining a location of an antenna supporting structure using data associated with different air interface types and/or aerial image data. At block 1210, a first set of data associated with a first antenna installed on the antenna supporting structure may be obtained as described above with respect to FIGS. 3, 4, 7, 8, and 11, for example, by a server (e.g., server 240 of FIG. 2 or server 640 of FIG. 6) from one or more mobile devices (e.g., mobile device 220-1, 220-2, or 220-3 of FIG. 2 or mobile device 220-1, 220-2, or 220-3 of FIG. 6) in communication with the first antenna (e.g., antenna 230-1, 230-2, . . . , or 230-n of FIG. 2, or antenna 630-1, 630-2, . . . , or 630-n of FIG. 6). The first antenna may be used for a first air interface type, such as GSM, CDMA, W-CDMA, UMTS, LTE, or LTE Advanced. The first set of data may include distance, signal strength, or timing information indicating a distance between each mobile device of the one or more mobile devices and the first antenna, such as RSSI or RTT information as described above, or distance information determined based on the RSSI or RTT information. The first set of data may also include information regarding the first air interface type, for example, data identifying the first air interface type, the positioning method used to determine the distances, and corresponding accuracy information regarding the accuracy of the determined distances.

At block 1220, a second set of data associated with a second antenna installed on the antenna supporting structure may be obtained, for example, by a server (e.g., server 240 of FIG. 2 or server 640 of FIG. 6) from one or more mobile devices (e.g., mobile device 220-1, 220-2, or 220-3 of FIG. 2 or mobile device 220-1, 220-2, or 220-3 of FIG. 6) in communication with the second antenna (e.g., antenna 230-1, 230-2, . . . , or 230-n of FIG. 2, or antenna 630-1, 630-2, . . . , or 630-n of FIG. 6). The second antenna may be used for a second air interface type different from the first air interface type. The second air interface type may be one of GSM, CDMA, W-CDMA, UMTS, LTE, or LTE Advanced. The second set of data may include information indicating a distance between each mobile device of the one or more mobile devices and the second antenna as described above. The second set of data may also include information regarding the second air interface type, for example, data identifying the second air interface type, the positioning method used to determine the distances, and corresponding accuracy information regarding the accuracy of the determined distances.

At block 1230, the location of the antenna supporting structure may be determined using combined data including the first set of data and the second set of data. For example, the location of the antenna supporting structure may be determined as described above with respect to FIG. 3, where the air interface type that allows for more accurate antenna location determination may be identified and selected from the first air interface type and the second air interface type based on the first set of data and the second set of data, and an antenna location may then be determined based on the first set of data or the second set of data associated with the air interface type that allows for more accurate antenna location determination, and assigned as the common location of the antenna supporting structure and the first and the second antennas.

In one example, the location of the antenna supporting structure may be determined as described above with respect to FIG. 4, where a first location of the first antenna may be determined based on the first set of data and used as a candidate location for determining a second location of the second antenna and the location of the antenna supporting structure, based on the second set of data.

In another example, the location of the antenna supporting structure may be determined as described above with respect to FIG. 7 or 8, using, for example, a trilateration or triangulation technique, based on at least some data from the first set of data and at least some data from the second set of data, or based on at least some data from the first set of data, at least some data from the second set of data, and at least some data from a third set of data associated with a third antenna for a third air interface type.

In yet another example, the location of the antenna supporting structure may be determined as described above with respect to FIG. 11, where a candidate location of the antenna supporting structure may be determined based on data associated with one or more antennas for one or more air interface types, and an aerial image of a geographic area including the candidate location may be used to determine a more accurate location of the antenna supporting structure.

Figure 13:
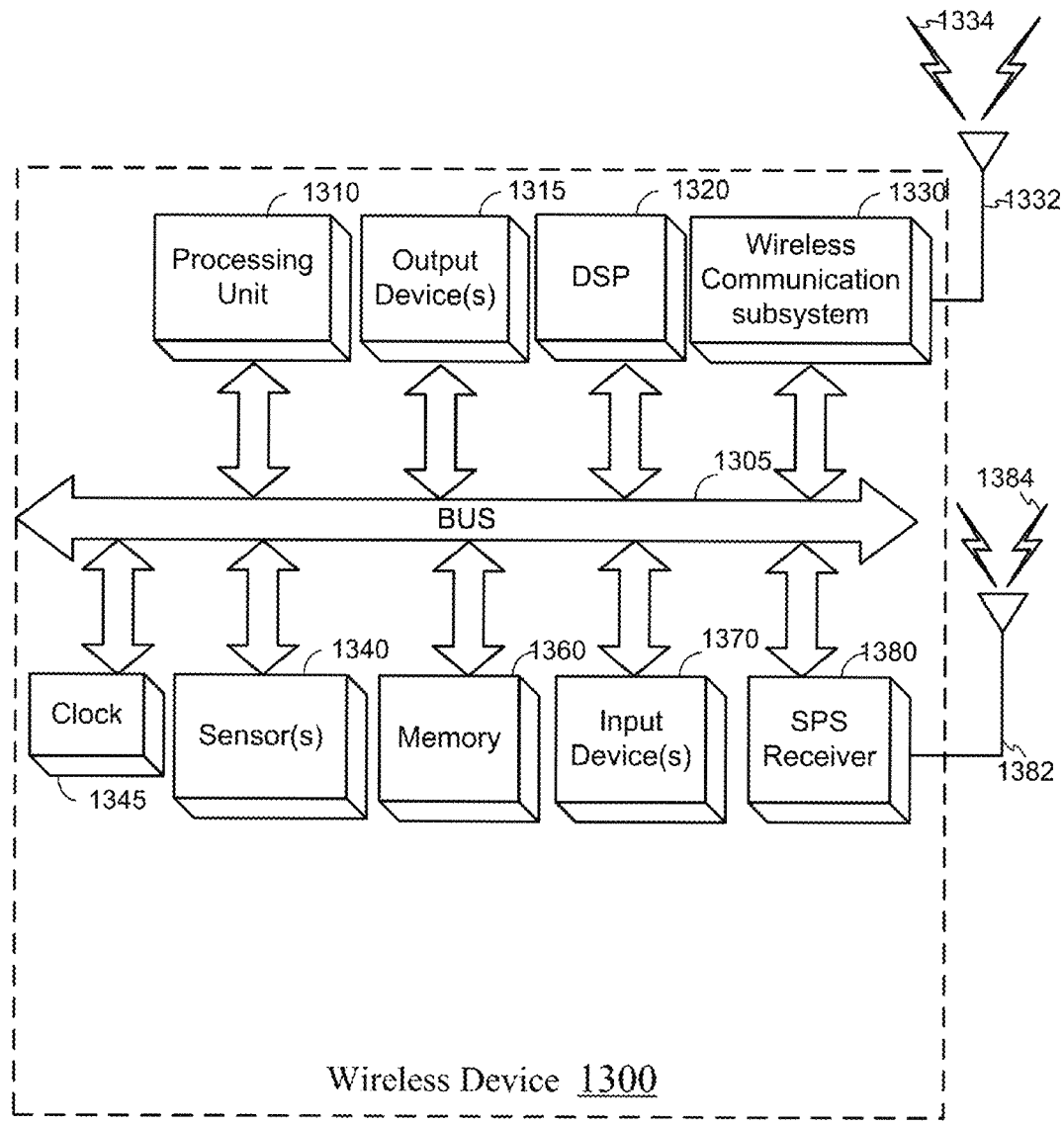
FIG. 13 is a block diagram of an embodiment of a wireless device.
Figure 14:
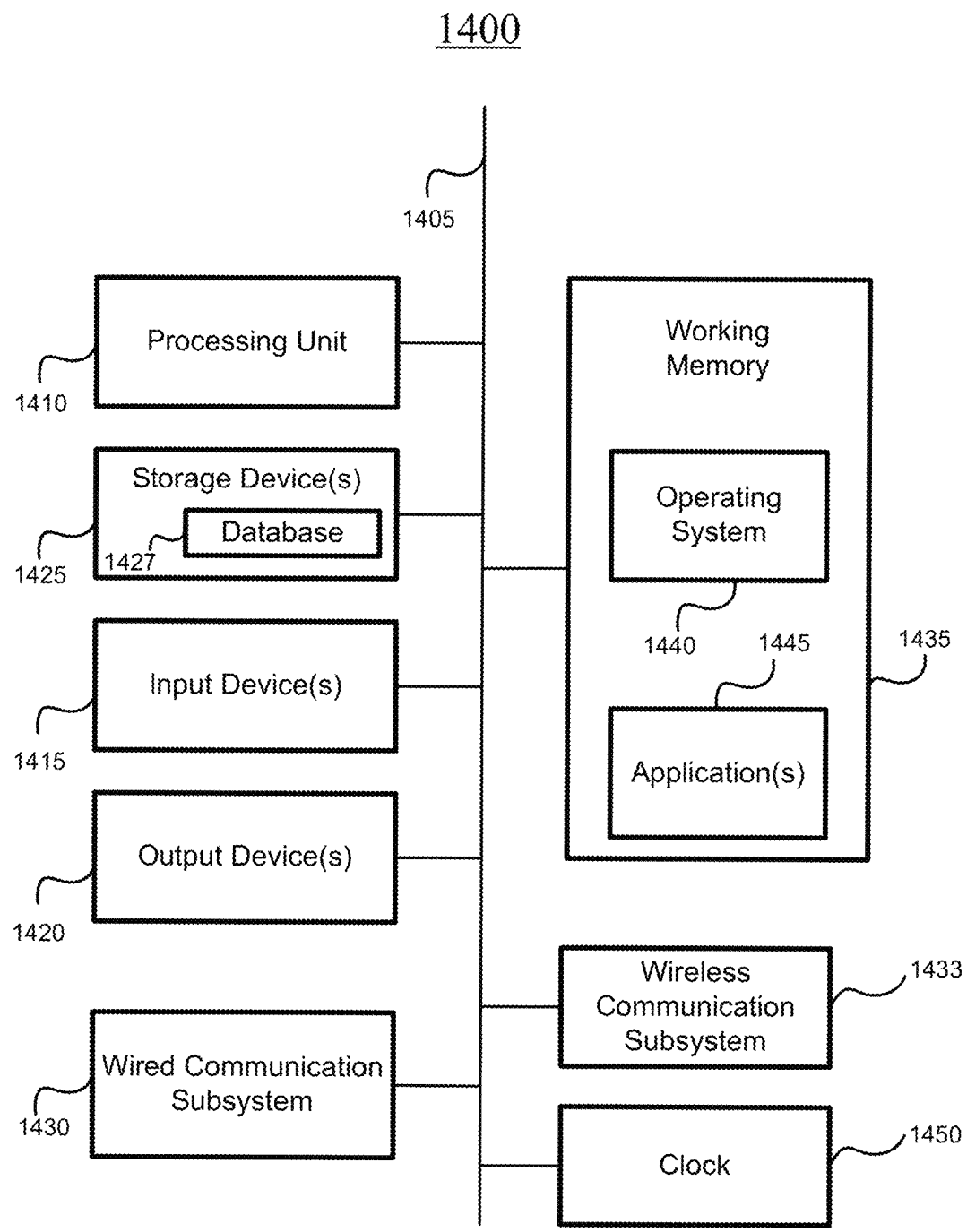
FIG. 14 is a block diagram of an embodiment of a computing system.

In various embodiments, means for obtaining data associated with one or more antennas for one or more air interface types (for example, a first set of data associated with a first antenna for a first air interface type and a second set of data associated with a second antenna for a second air interface type different from the first air interface type) or means for obtaining aerial images (for example, an aerial image of a geographic area comprising a candidate location of an antenna supporting structure), may include, but are not limited to, for example, server 240 of FIG. 2, server 640 of FIG. 6, mobile devices 220-1, 220-2, and 220-3 of FIG. 2, mobile devices 220-1, 220-2, and 220-3 of FIG. 6, wireless communication subsystem 1330, processing unit 1310, memory 1360, clock 1345, and/or bus 1305 as illustrated in FIG. 13 and described in detail below, wireless communication subsystem 1433, processing unit 1410, working memory 1435, clock 1450, and/or bus 1405 as illustrated in FIG. 14 and described in detail below.

In various embodiments, means for determining a location or a candidate location of an antenna or an antenna supporting structure based on combined data associated with one or more antennas for one or more air interface types (for example, a first set of data associated with a first antenna for a first air interface type or a second set of data associated with a second antenna for a second air interface type different from the first air interface type, or, for example, combined data comprising the first set of data and the second set of data) may include, but are not limited to, for example, server 240 of FIG. 2, server 640 of FIG. 6, mobile devices 220-1, 220-2, and 220-3 of FIG. 2, mobile devices 220-1, 220-2, and 220-3 of FIG. 6, processing unit 1310, memory 1360, and/or bus 1305 as illustrated in FIG. 13 and described in detail below, processing unit 1410, working memory 1435, and/or bus 1405 as illustrated in FIG. 14 and described in detail below.

In various embodiments, means for identifying and determining a location of an antenna supporting structure based on an aerial image and/or geographic metadata associated with the aerial image may include, but are not limited to, for example, server 240 of FIG. 2, server 640 of FIG. 6, mobile devices 220-1, 220-2, and 220-3 of FIG. 2, mobile devices 220-1, 220-2, and 220-3 of FIG. 6, wireless communication subsystem 1330, processing unit 1310, memory 1360, and/or bus 1305 as illustrated in FIG. 13 and described in detail below, wireless communication subsystem 1433, processing unit 1410, working memory 1435, and/or bus 1405 as illustrated in FIG. 14 and described in detail below.

It is noted that even though FIGS. 3, 4, 7-9, 11, and 12 describe the operations as sequential processes, many of the operations can be performed in parallel or concurrently. In addition, the order of the operations may be rearranged. An operation may have additional steps not included in the figure. Some operations may be optional, and thus may be omitted in various embodiments. Some operations described in one block may be performed together with operations at another block. For example, some operations may be performed in parallel. Furthermore, embodiments of the methods may be implemented in hardware, software, firmware, middleware, microcode, hardware description languages, or any combination thereof.

FIG. 13 illustrates an embodiment of a wireless device 1300, which can be utilized as described herein above. For example, wireless device 1300 can be used as an AP, a mobile device, a base transceiver station, or a server as described in relation to the embodiments previously provided herein. It should be noted that FIG. 13 is meant only to provide a generalized illustration of various components, any or all of which may be utilized as appropriate. It can be noted that, in some instances, components illustrated by FIG. 13 can be localized to a single physical device and/or distributed among various networked devices, which may be disposed at different physical locations. In some embodiments, for example, wireless device 1300 can be a cellular telephone or other mobile electronic device. In some embodiments, wireless device 1300 may be a stationary device, such as an AP or a base transceiver station. As such, as previously indicated, components may vary from embodiment to embodiment.

Wireless device 1300 is shown comprising hardware elements that can be electrically coupled via a bus 1305 (or may otherwise be in communication, as appropriate). The hardware elements may include a processing unit(s) 1310 which can include without limitation one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein. As shown in FIG. 13, some embodiments may have a separate DSP 1320, depending on desired functionality. Wireless device 1300 also can include one or more input devices 1370, which can include without limitation a touch screen, a touch pad, microphone, button(s), dial(s), switch(es), and/or the like; and one or more output devices 1315, which can include without limitation a display, light emitting diodes (LEDs), speakers, and/or the like.

Wireless device 1300 might also include a wireless communication subsystem 1330, which can include without limitation a modem, a network card, an infrared communication device, a wireless communication device, and/or a chipset (such as a Bluetooth device, an International Electrical and Electronics Engineers (IEEE) 802.11 device (e.g., a device utilizing one or more of the 802.11 standards described herein), an IEEE 802.15.4 device, a WiFi device, a WiMax device, cellular communication facilities, etc.), and/or the like. Wireless communication subsystem 1330 may permit data to be exchanged with a network, wireless access points, other computer systems, and/or any other electronic devices described herein, such as the configuration of FIG. 1. The communication can be carried out via one or more wireless communication antenna(s) 1332 that send and/or receive wireless signals 1334. In various embodiments, wireless communication subsystem 1330 may be used to measure the timing information and/or RSSI of a signal from an antenna for estimating a distance between wireless device 1300 and the antenna, based on, for example, the time of flight, round-trip time, or signal strength information as described above with respect to FIGS. 1-3 and 12.

Depending on desired functionality, wireless communication subsystem 1330 can include separate transceivers to communicate with antennas of base transceiver stations and other wireless devices and access points as described above, which may include communicating with different data networks and/or network types, such as wireless wide-area networks (WWANs), wireless local area networks (WLANs), or wireless personal area networks (WPANs). A WWAN may be a network using any air interface technology, for example, a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, W-CDMA, and so on. Cdma2000 includes IS-95, IS-2000, and/or IS-856 standards. A TDMA network may implement GSM, Digital Advanced Mobile Phone System (D-AMPS), or some other RATs. An OFDMA network may employ LTE, LTE Advanced, and so on. LTE, LTE Advanced, GSM, and W-CDMA are described in documents from 3GPP. Cdma2000 is described in documents from a consortium named "3rd Generation Partnership Project 2" (3GPP2). 3GPP and 3GPP2 documents are publicly available. A WLAN may be an IEEE 802.11x network. A WPAN may be a Bluetooth network, an IEEE 802.15x, or some other type of network. The techniques described herein may also be used for any combination of WWAN, WLAN and/or WPAN.

Wireless device 1300 may include a clock 1345 on bus 1305, which can generate a signal to synchronize various components on bus 1305. Clock 1345 may include an inductor-capacitor (LC) oscillator, a crystal oscillator, a ring oscillator, a digital clock generator such as a clock divider or clock multiplexer, a phase locked loop, or other clock generator. Clock 1345 may be synchronized (or substantially synchronized) with corresponding clocks on other wireless devices. Clock 1345 may be driven by wireless communication subsystem 1330, which may be used to synchronize clock 1345 of wireless device 1300 to one or more other devices. Clock 1345 may be used for timing measurement.

Wireless device 1300 can further include sensor(s) 1340. Such sensors can include, without limitation, one or more accelerometer(s), gyroscope(s), camera(s), magnetometer(s), altimeter(s), microphone(s), proximity sensor(s), light sensor(s), and the like. Some or all of sensor(s) 1340 can be utilized, among other things, for dead reckoning and/or other positioning methods. Such positioning methods may be used to determine a location of wireless device 1300, and may utilize and/or complement the RTT values obtained as described herein.

Embodiments of the wireless device 1300 may also include an SPS receiver 1380 capable of receiving signals 1384 from one or more SPS satellites using an SPS antenna 1382. Such positioning can be utilized to complement and/or incorporate the techniques for calculating RTT described herein. SPS receiver 1380 can extract a position of the wireless device 1300, using conventional techniques, from SPS satellite vehicles (SVs) of an SPS system, such as global navigation satellite system (GNSS) (e.g., Global Positioning System (GPS)), Galileo, Glonass, Compass, Quasi-Zenith Satellite System (QZSS) over Japan, Indian Regional Navigational Satellite System (IRNSS) over India, Beidou over China, and/or the like. Moreover, SPS receiver 1380 can use various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein, an SPS system may include any combination of one or more global and/or regional navigation satellite systems and/or augmentation systems, and SPS signals may include SPS, SPS-like, and/or other signals associated with one or more such SPS systems.

Wireless device 1300 may further include and/or be in communication with a memory 1360. Memory 1360 may include any non-transitory storage device, and may include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

Memory 1360 of wireless device 1300 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above, such as the methods shown in FIGS. 3, 4, 7-9, 11, and 12 might be implemented as code and/or instructions that can be stored or loaded in memory 1360 and be executed by wireless device 1300, a processing unit within wireless device 1300, and/or another device of a wireless system. In an aspect, such code and/or instructions can be used to configure and/or adapt a general purpose computer (or other device) to perform one or more operations in accordance with the described methods.

FIG. 14 illustrates components of a computing system 1400, according to one embodiment. For example, computing system 1400 can be used as an AP, a base transceiver station, a server, or a mobile device as described in relation to the embodiments previously provided herein, and may communicate in a wireless communication system with one or more mobile devices. In various embodiment, in contrast to the wireless device 1300 of FIG. 13 which may be mobile, computing system 1400 of FIG. 14 may, for example, be a stationary device (or set of devices). It should be noted that FIG. 14 is meant only to provide a generalized illustration of various components, any or all of which may be utilized as appropriate. Moreover, system elements may be implemented in a relatively separated or relatively more integrated manner.

Computing system 1400 is shown comprising hardware elements that can be electrically coupled via a bus 1405 (or may otherwise be in communication, as appropriate). The hardware elements may include a processing unit 1410, including without limitation one or more general-purpose processors and/or one or more special-purpose processors (such as digital signal processing chips, graphics acceleration processors, and/or the like), one or more input devices 1415, and one or more output devices 1420. Input device(s) 1415 can include without limitation camera(s), a touchscreen, a touch pad, microphone(s), a keyboard, a mouse, button(s), dial(s), switch(es), and/or the like. Output devices 1420 may include without limitation a display device, a printer, LEDs, speakers, and/or the like.

Computing system 1400 can also include a wired communication subsystem 1430 and wireless communication technologies managed and controlled by a wireless communication subsystem 1433. As such, wired communication subsystem 1430 and wireless communication subsystem 1433 can include, without limitation, a modem, a network interface (wireless, wired, both, or other combination thereof), an infrared communication device, a wireless communication device, and/or a chipset (such as a Bluetooth™ device, an IEEE 802.11 device (e.g., a device utilizing one or more of the IEEE 802.11 standards described herein), a WiFi device, a WiMax device, cellular communication facilities, etc.), and/or the like. Subcomponents of the network interface may vary, depending on the type of computing system 1400 (e.g., mobile phone, personal computer, etc.). Wired communication subsystem 1430 and wireless communication subsystem 1433 may include one or more input and/or output communication interfaces to permit data to be exchanged with a data network, other computer systems, and/or any other devices described herein. Moreover, wired communication subsystem 1430 and/or wireless communication subsystem 1433 may permit computing system 1400 to determine RTT via uplink multiple-input multiple-output (MIMO) processes.

Similar to wireless device 1300 of FIG. 13, computing system 1400 of FIG. 14 may include a clock 1450 on bus 1405, which can generate a signal to synchronize the various components on bus 1405. Clock 1450 may include an LC oscillator, a crystal oscillator, a ring oscillator, a digital clock generator such as a clock divider or clock multiplexer, a phase locked loop, or other clock generator. Clock 1450 may be synchronized (or substantially synchronized) with corresponding clocks on other wireless devices while performing the techniques described herein. Clock 1450 may be driven by wireless communication subsystem 1433, which may be used to synchronize clock 1450 of computing system 1400 to one or more other devices. Clock 1450 may be used for timing measurement.

Computing system 1400 may further include (and/or be in communication with) one or more non-transitory storage devices 1425, which can comprise, without limitation, local and/or network accessible storage, and/or can include, without limitation, a disk drive, a drive array, an optical storage device, a solid-state storage device, such as a RAM and/or a ROM, which can be programmable, flash-updateable and/or the like. Such storage devices may be configured to implement any appropriate data stores, including without limitation, various file systems, database structures, and/or the like. For instance, storage device(s) 1425 may include a database 1427 (or other data structure) configured to store timestamp values as described in embodiments herein, which may be provided to APs and/or other devices via wired communication subsystem 1430 or wireless communication subsystem 1433.

In many embodiments, computing system 1400 may further comprise a working memory 1435, which can include a RAM or ROM device, as described above. Software elements, shown as being currently located within working memory 1435, can include an operating system 1440, device drivers, executable libraries, and/or other code, such as one or more application programs 1445, which may comprise software programs provided by various embodiments, and/or may be designed to implement methods, and/or configure systems, provided by other embodiments, as described herein, such as some or all of the methods described in relation to FIGS. 3, 4, 7-9, 11, and 12. Merely by way of example, one or more procedures described with respect to the method(s) discussed above might be implemented as code and/or instructions executable by a computer (and/or a processor within a computer). In an aspect, such code and/or instructions can be used to configure and/or adapt a general purpose computer (or other device) to perform one or more operations in accordance with the described methods.

A set of these instructions and/or code might be stored on a non-transitory computer-readable storage medium, such as non-transitory storage device(s) 1425 described above. In some cases, the storage medium might be incorporated within a computer system, such as computing system 1400. In other embodiments, the storage medium might be separate from a computer system (e.g., a removable medium, such as a flash drive), and/or provided in an installation package, such that the storage medium can be used to program, configure, and/or adapt a general purpose computer with the instructions/code stored thereon. These instructions might take the form of executable code, which is executable by computing system 1400 and/or might take the form of source and/or installable code, which, upon compilation and/or installation on computing system 1400 (e.g., using any of a variety of generally available compilers, installation programs, compression/decompression utilities, etc.), then takes the form of executable code.

It will be apparent to those skilled in the art that variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The terms "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, information, data, values, elements, symbols, characters, variables, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining," "ascertaining," "identifying," "associating," "measuring," "performing," or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Wireless communication techniques described herein may be in connection with various wireless communications networks such as a WWAN, a WLAN, a WPAN, and so on. The term "network" and "system" may be used interchangeably herein. A WWAN may be a CDMA network, a TDMA network, an FDMA network, an OFDMA network, an SC-FDMA network, or any combination of the above networks, and so on. For example, a WLAN may comprise an IEEE 802.11x network, and a WPAN may comprise a Bluetooth network, an IEEE 802.15x. Wireless communication implementations described herein may also be used in connection with any combination of WWAN, WLAN or WPAN.

In another aspect, as previously mentioned, a wireless transmitter or access point may comprise a cellular transceiver device, utilized to extend cellular telephone service into a business or home. In such an implementation, one or more mobile devices may communicate with a cellular transceiver device via a CDMA cellular communication protocol, for example.

Techniques described herein may be used with an SPS that includes any one of several GNSS and/or combinations of GNSS. Furthermore, such techniques may be used with positioning systems that utilize terrestrial transmitters acting as "pseudolites," or a combination of SVs and such terrestrial transmitters. Terrestrial transmitters may, for example, include ground-based transmitters that broadcast a pseudo noise (PN) code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV," as used herein, is intended to include terrestrial transmitters acting as pseudolites, equivalents of pseudolites, and possibly others. The terms "SPS signals" and/or "SV signals," as used herein, are intended to include SPS-like signals from terrestrial transmitters, including terrestrial transmitters acting as pseudolites or equivalents of pseudolites.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, electrically erasable programmable read-only memory (EEPROM), compact disc read-only memory (CD-ROM) or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time, the transmission media included in the communication apparatus may include a second portion of the information to perform the disclosed functions.

What is claimed is:

1. A method for determining a location of an antenna supporting structure, the method comprising:

obtaining a first set of data associated with a first antenna for a first air interface type, the first antenna installed on the antenna supporting structure;

obtaining a second set of data associated with a second antenna for a second air interface type different from the first air interface type, the second antenna installed on the antenna supporting structure; and determining the location of the antenna supporting structure using combined data comprising the first set of data and the second set of data.

2. The method of claim 1, wherein:

the first air interface type comprises at least one of Global System for Mobile Communications (GSM), Code Division Multiple Access (CDMA), Wideband-CDMA (W-CDMA), Universal Mobile Telecommunications System (UMTS), Long Term Evolution (LTE), or LTE advanced; and the second air interface type comprises at least one of GSM, CDMA, W-CDMA, UMTS, LTE, or LTE advanced.

3. The method of claim 1, wherein the first set of data comprises information regarding a distance or a time of flight of a wireless signal between a mobile device and the first antenna.

4. The method of claim 1, wherein determining the location of the antenna supporting structure using combined data comprises:

performing a multi-lateration or multi-angulation operation using at least some data from the first set of data and at least some data from the second set of data.

5. The method of claim 1, further comprising:

obtaining a third set of data associated with a third antenna for a third air interface type different from the first and the second air interface types, the third antenna installed on the antenna supporting structure, wherein determining the location of the antenna supporting structure comprises performing a multi-lateration or multi-angulation operation using at least some data from the first set of data, at least some data from the second set of data, and at least some data from the third set of data.

6. The method of claim 1, wherein determining the location of the antenna supporting structure using combined data comprises:

determining a first location of the first antenna based on the first set of data;

determining, using the first location as a candidate location, a second location of the second antenna based on the second set of data; and assigning the second location as the location of the antenna supporting structure.

7. The method of claim 1, wherein determining the location of the antenna supporting structure using combined data comprises:

determining a first candidate region for a location of the first antenna based on the first set of data;

determining a second candidate region for a location of the second antenna based on the second set of data; and determining the location of the antenna supporting structure based on an overlapped region of the first candidate region and the second candidate region.

8. The method of claim 1, wherein determining the location of the antenna supporting structure using combined data comprises:

identifying the first air interface type or the second air interface type as an air interface type that allows for more accurate antenna location determination based on the first set of data and the second set of data;

determining an antenna location based on the first set of data or the second set of data associated with the air interface type that allows for more accurate antenna location determination; and assigning the antenna location as the location of the antenna supporting structure.

9. The method of claim 1, wherein determining the location of the antenna supporting structure using combined data comprises:

determining a candidate location of the antenna supporting structure based on at least one of the first set of data or the second set of data;

obtaining an aerial image of a geographic area comprising the candidate location, the aerial image comprising associated geographic metadata to enable the computation of a geographic location of objects captured in the image;

identifying the antenna supporting structure in the aerial image using computer-based image processing; and determining the location of the antenna supporting structure identified using the computer-based image processing based on the geographic metadata.

10. The method of claim 1, further comprising:

identifying the first antenna and the second antenna as installed on the antenna supporting structure.

11. A system comprising:

a memory comprising machine-readable instructions stored thereon; and a processing unit communicatively coupled to the memory and configured to execute the machine-readable instructions to determine a location of an antenna supporting structure by:

obtaining a first set of data associated with a first antenna for a first air interface type, the first antenna installed on the antenna supporting structure;

obtaining a second set of data associated with a second antenna for a second air interface type different from the first air interface type, the second antenna installed on the antenna supporting structure; and determining the location of the antenna supporting structure using combined data comprising the first set of data and the second set of data.

12. The system of claim 11, wherein:

the first air interface type comprises at least one of Global System for Mobile Communications (GSM), Code Division Multiple Access (CDMA), Wideband-CDMA (W-CDMA), Universal Mobile Telecommunications System (UMTS), Long Term Evolution (LTE), or LTE advanced; and the second air interface type comprises at least one of GSM, CDMA, W-CDMA, UMTS, LTE, or LTE advanced.

13. The system of claim 11, wherein the first set of data comprises information regarding a distance or a time of flight of a wireless signal between a mobile device and the first antenna.

14. The system of claim 11, wherein determining the location of the antenna supporting structure using combined data comprises:

performing a multi-lateration or multi-angulation operation using at least some data from the first set of data and at least some data from the second set of data.

15. The system of claim 11, wherein the processing unit is further configured to execute the machine-readable instructions to determine the location of the antenna supporting structure by:
  obtaining a third set of data associated with a third antenna for a third air interface type different from the first and the second air interface types, the third antenna installed on the antenna supporting structure,
  wherein determining the location of the antenna supporting structure comprises performing a multi-lateration or multi-angulation operation using at least some data from the first set of data, at least some data from the second set of data, and at least some data from the third set of data.

16. The system of claim 11, wherein determining the location of the antenna supporting structure using combined data comprises:
  determining a first location of the first antenna based on the first set of data;
  determining, using the first location as a candidate location, a second location of the second antenna based on the second set of data; and
  assigning the second location as the location of the antenna supporting structure.

17. The system of claim 11, wherein determining the location of the antenna supporting structure using combined data comprises:
  determining a first candidate region for a location of the first antenna based on the first set of data;
  determining a second candidate region for a location of the second antenna based on the second set of data; and
  determining the location of the antenna supporting structure based on an overlapped region of the first candidate region and the second candidate region.

18. The system of claim 11, wherein determining the location of the antenna supporting structure using combined data comprises:
  identifying the first air interface type or the second air interface type as an air interface type that allows for more accurate antenna location determination based on the first set of data and the second set of data;
  determining an antenna location based on the first set of data or the second set of data associated with the air interface type that allows for more accurate antenna location determination; and
  assigning the antenna location as the location of the antenna supporting structure.

19. The system of claim 11, wherein determining the location of the antenna supporting structure using combined data comprises:
  determining a candidate location of the antenna supporting structure based on at least one of the first set of data or the second set of data;
  obtaining an aerial image of a geographic area comprising the candidate location, the aerial image comprising associated geographic metadata to enable the computation of a geographic location of objects captured in the image;
  identifying the antenna supporting structure in the aerial image using computer-based image processing; and
  determining the location of the antenna supporting structure identified using the computer-based image processing based on the geographic metadata.

20. A non-transitory computer-readable storage medium comprising machine-readable instructions stored thereon that, when executed by one or more processing units, cause the one or more processing units to determine a location of an antenna supporting structure by:
  obtaining a first set of data associated with a first antenna for a first air interface type, the first antenna installed on the antenna supporting structure;
  obtaining a second set of data associated with a second antenna for a second air interface type different from the first air interface type, the second antenna installed on the antenna supporting structure; and
  determining the location of the antenna supporting structure using combined data comprising the first set of data and the second set of data.

21. The non-transitory computer-readable storage medium of claim 20, wherein:
  the first air interface type comprises at least one of Global System for Mobile Communications (GSM), Code Division Multiple Access (CDMA), Wideband-CDMA (W-CDMA), Universal Mobile Telecommunications System (UMTS), Long Term Evolution (LTE), or LTE advanced; and
  the second air interface type comprises at least one of GSM, CDMA, W-CDMA, UMTS, LTE, or LTE advanced.

22. The non-transitory computer-readable storage medium of claim 20, wherein the first set of data comprises information regarding a distance or a time of flight of a wireless signal between a mobile device and the first antenna.

23. The non-transitory computer-readable storage medium of claim 20, wherein determining the location of the antenna supporting structure using combined data comprises:
  performing a multi-lateration or multi-angulation operation using at least some data from the first set of data and at least some data from the second set of data.

24. The non-transitory computer-readable storage medium of claim 20, wherein determining the location of the antenna supporting structure using combined data comprises:
  determining a first location of the first antenna based on the first set of data;
  determining, using the first location as a candidate location, a second location of the second antenna based on the second set of data; and
  assigning the second location as the location of the antenna supporting structure.

25. The non-transitory computer-readable storage medium of claim 20, wherein determining the location of the antenna supporting structure using combined data comprises:
  identifying the first air interface type or the second air interface type as an air interface type that allows for more accurate antenna location determination based on the first set of data and the second set of data;
  determining an antenna location based on the first set of data or the second set of data associated with the air interface type that allows for more accurate antenna location determination; and
  assigning the antenna location as the location of the antenna supporting structure.

26. The non-transitory computer-readable storage medium of claim 20, wherein determining the location of the antenna supporting structure using combined data comprises:
  determining a candidate location of the antenna supporting structure based on at least one of the first set of data or the second set of data;

obtaining an aerial image of a geographic area comprising the candidate location, the aerial image comprising associated geographic metadata to enable the computation of a geographic location of objects captured in the image;

identifying the antenna supporting structure in the aerial image using computer-based image processing; and determining the location of the antenna supporting structure identified using the computer-based image processing based on the geographic metadata.

27. An apparatus comprising:

means for obtaining a first set of data associated with a first antenna for a first air interface type, the first antenna installed on an antenna supporting structure;

means for obtaining a second set of data associated with a second antenna for a second air interface type different from the first air interface type, the second antenna installed on the antenna supporting structure; and means for determining a location of the antenna supporting structure using combined data comprising the first set of data and the second set of data.

28. The apparatus of claim 27, wherein:

the first air interface type comprises at least one of Global System for Mobile Communications (GSM), Code Division Multiple Access (CDMA), Wideband-CDMA (W-CDMA), Universal Mobile Telecommunications System (UMTS), Long Term Evolution (LTE), or LTE advanced; and the second air interface type comprises at least one of GSM, CDMA, W-CDMA, UMTS, LTE, or LTE advanced.

29. The apparatus of claim 27, wherein the first set of data comprises information regarding a distance or a time of flight of a wireless signal between a mobile device and the first antenna.

30. The apparatus of claim 27, wherein determining the location of the antenna supporting structure using combined data comprises:

performing a multi-lateration or multi-angulation operation using at least some data from the first set of data and at least some data from the second set of data.

* * * * *